United States Patent
Ahn et al.

(10) Patent No.: US 7,403,245 B2
(45) Date of Patent: Jul. 22, 2008

(54) LIQUID CRYSTAL DISPLAY DEVICE AND METHOD FOR FABRICATING THE SAME

(75) Inventors: Byung Chul Ahn, Ahnyang-shi (KR); Joo Soo Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 402 days.

(21) Appl. No.: 11/315,152

(22) Filed: Dec. 23, 2005

(65) Prior Publication Data
US 2006/0139526 A1 Jun. 29, 2006

(30) Foreign Application Priority Data
Dec. 24, 2004 (KR) ............ 10-2004-0112579

(51) Int. Cl.
*G02F 1/1335* (2006.01)
*G02F 1/13* (2006.01)
(52) U.S. Cl. ............ 349/114; 349/113; 349/187; 349/42
(58) Field of Classification Search ........... 349/114, 349/113, 139, 122, 149, 147, 42, 43, 46, 349/38, 19, 187, 189, 190
See application file for complete search history.

(56) References Cited
U.S. PATENT DOCUMENTS
5,929,949 A * 7/1999 Park ............... 349/44
2005/0190336 A1 * 9/2005 Chen ............... 349/155
2007/0170431 A1 * 7/2007 Choi et al. ............ 257/66
2007/0216842 A1 * 9/2007 Kawasaki et al. ........ 349/141

* cited by examiner

Primary Examiner—Brian M Healy
(74) Attorney, Agent, or Firm—McKenna, Long & Aldridge LLP

(57) ABSTRACT

This invention relates to a liquid crystal display device that reduces a parasitic capacitance, and a fabricating method thereof.

A liquid crystal display device, including: a gate line with a multi-layer structure having a transparent first conductive layer and an opaque second conductive layer; a data line crossing the gate line with a gate insulating film in between to define a pixel area; a thin film transistor connected to the gate line and the data line; a pixel electrode formed of the first conductive layer in the pixel area, wherein the second conductive layer remains along an edge of the first conductive layer at an edge of the pixel area; a transmission hole that penetrates from an organic insulating film on the thin film transistor to the gate insulating film to expose the first conductive layer of the pixel electrode; a reflection electrode on the organic insulating film extending along a part of a side surface of the transmission hole to connect the pixel electrode and a drain electrode of the thin film transistor; and a floating electrode on the organic insulating film that overlaps both sides of the data line.

36 Claims, 20 Drawing Sheets

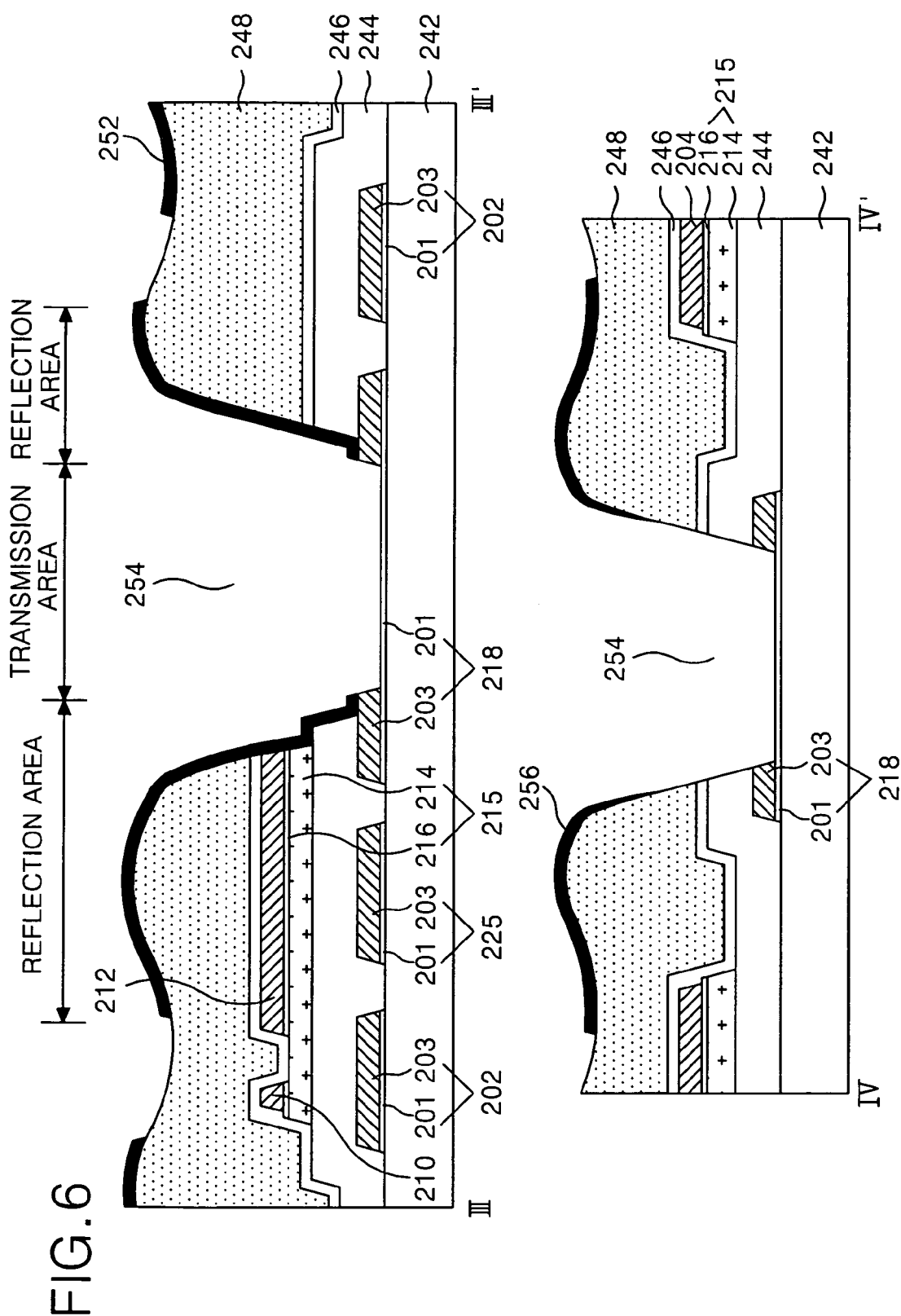

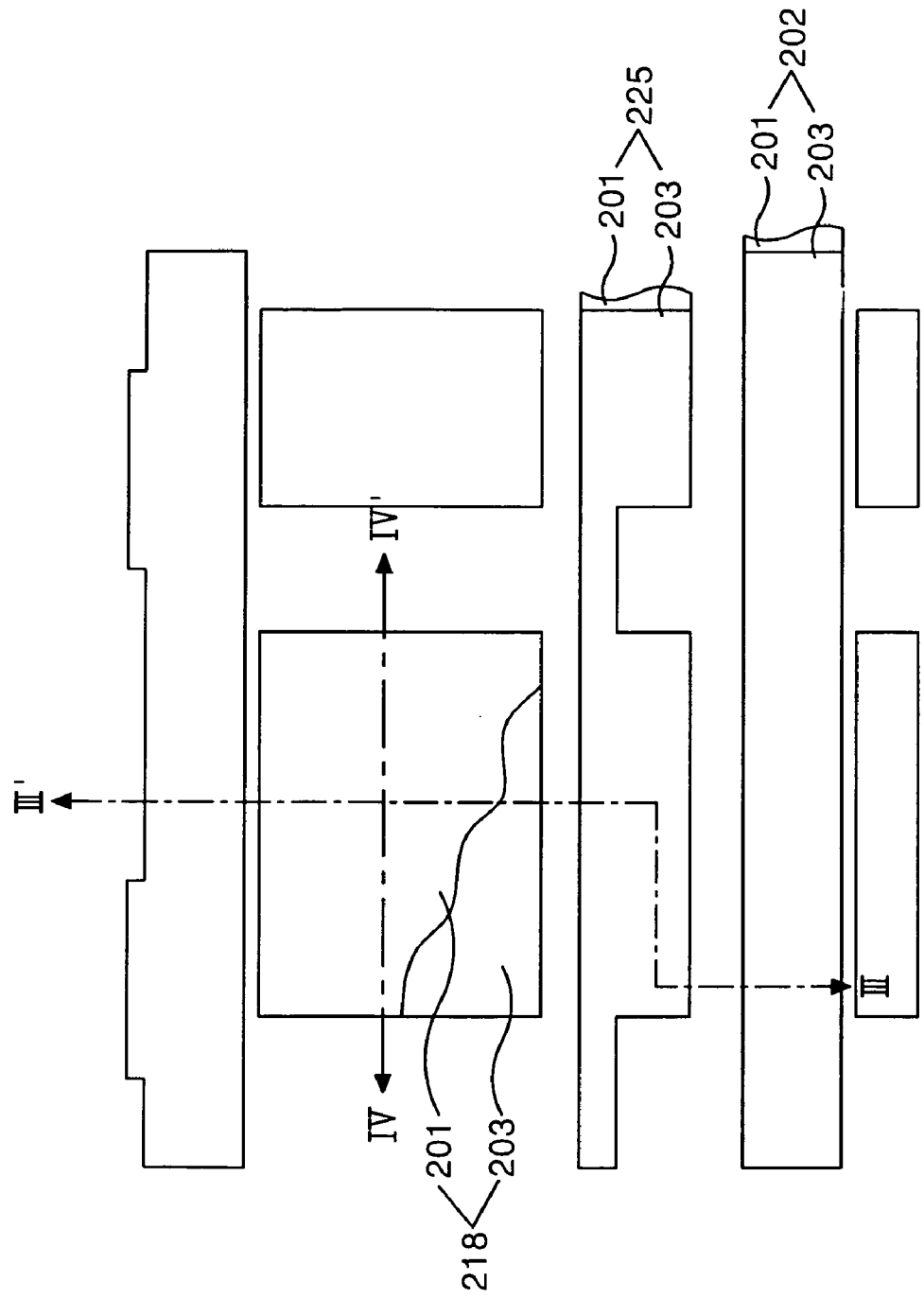

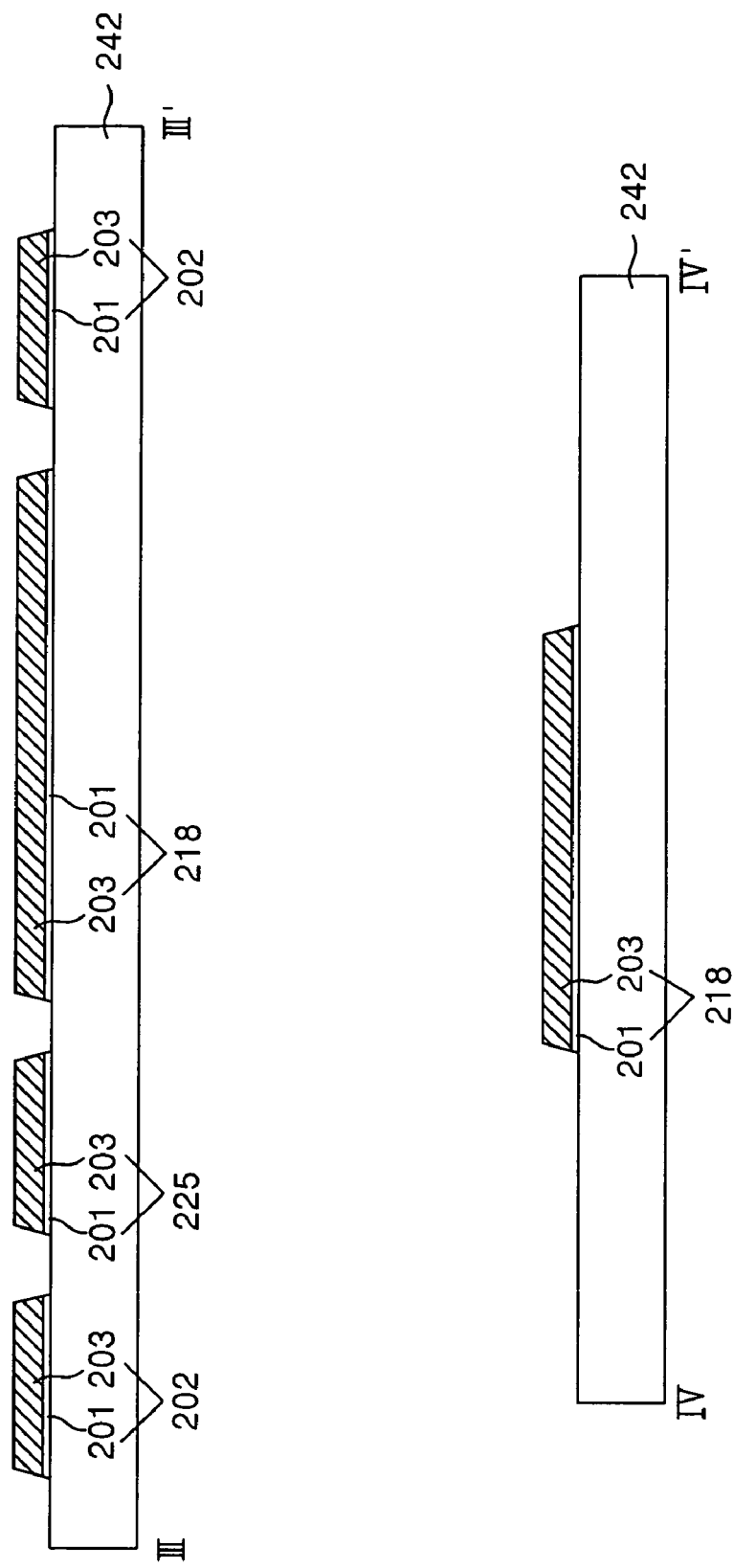

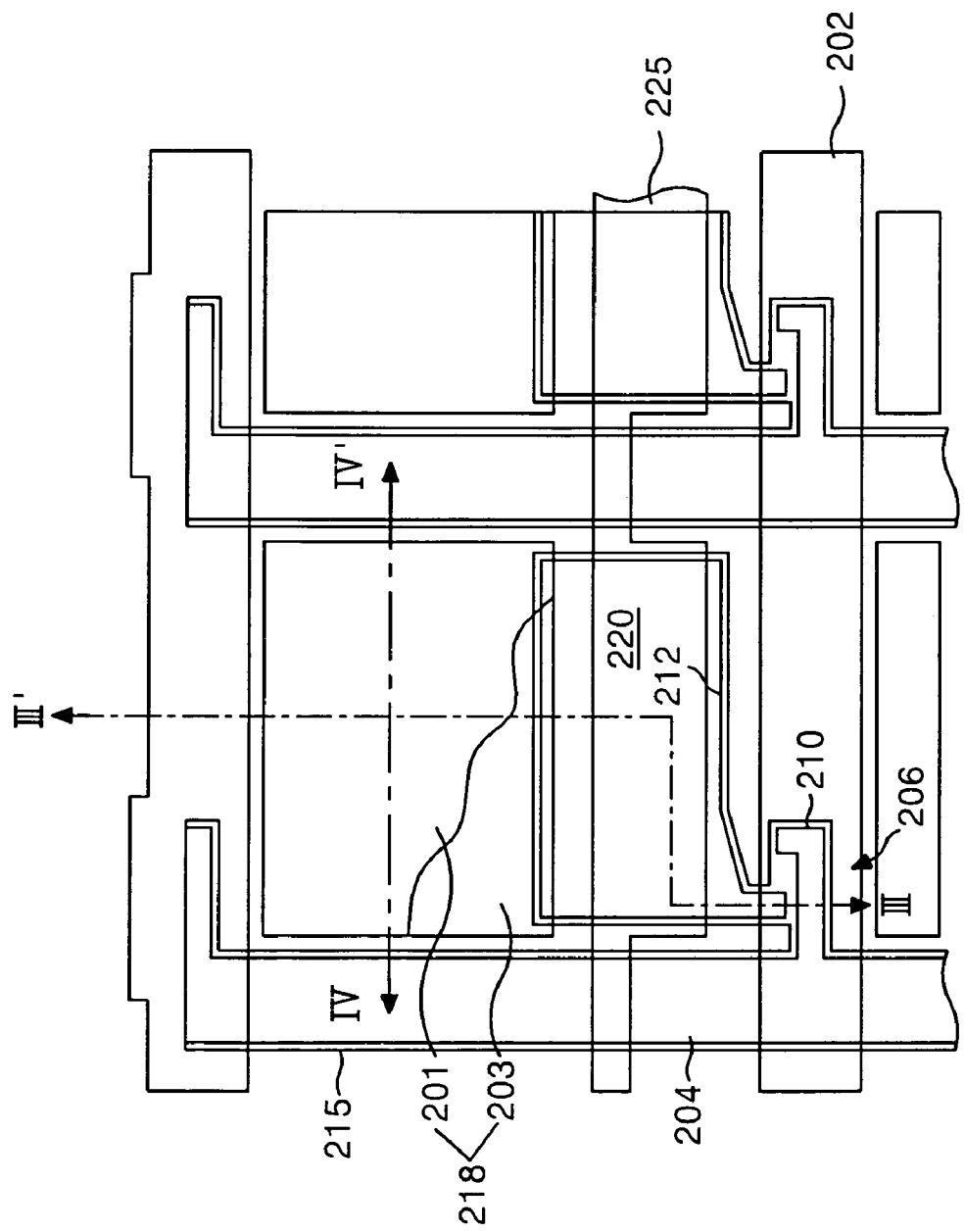

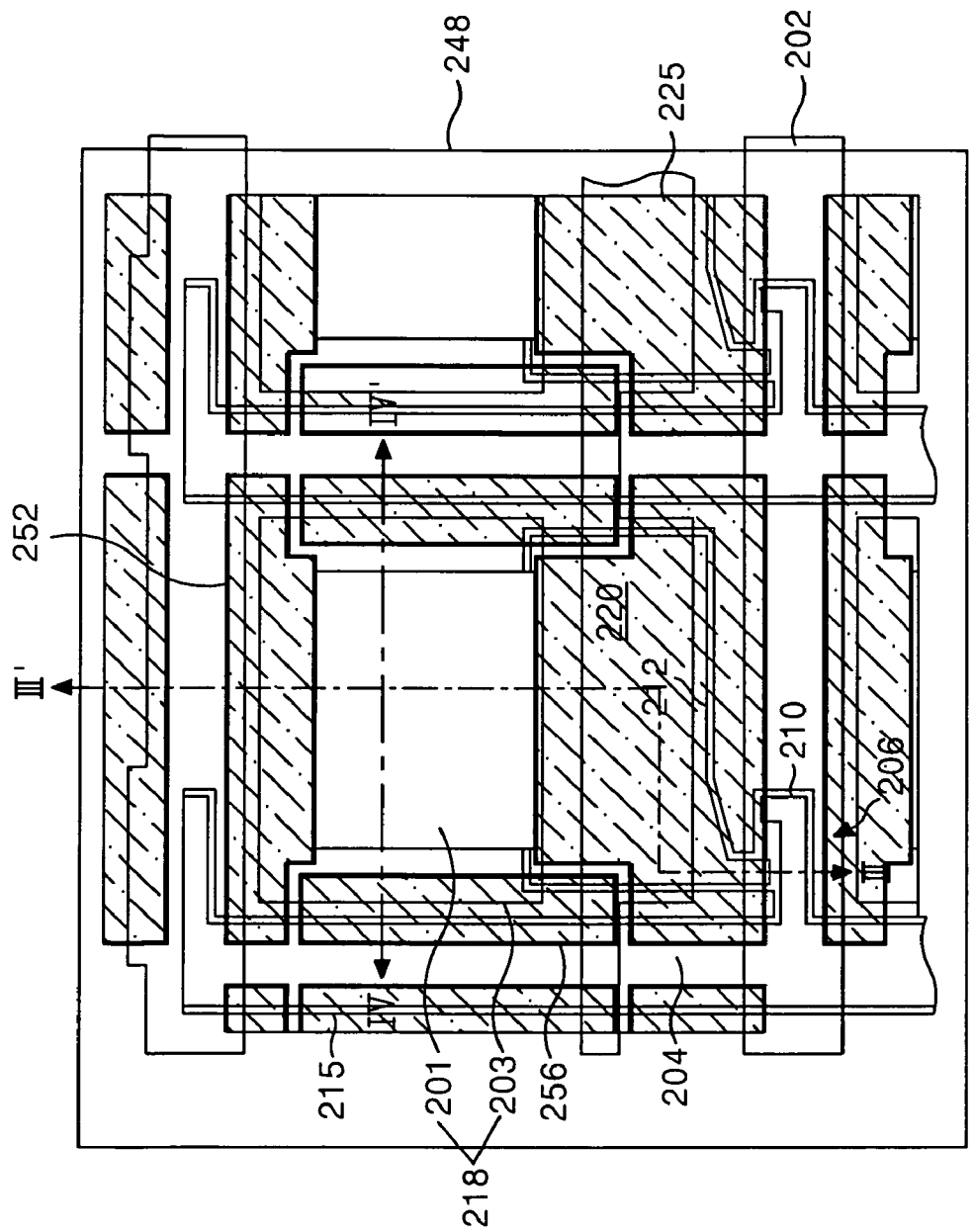

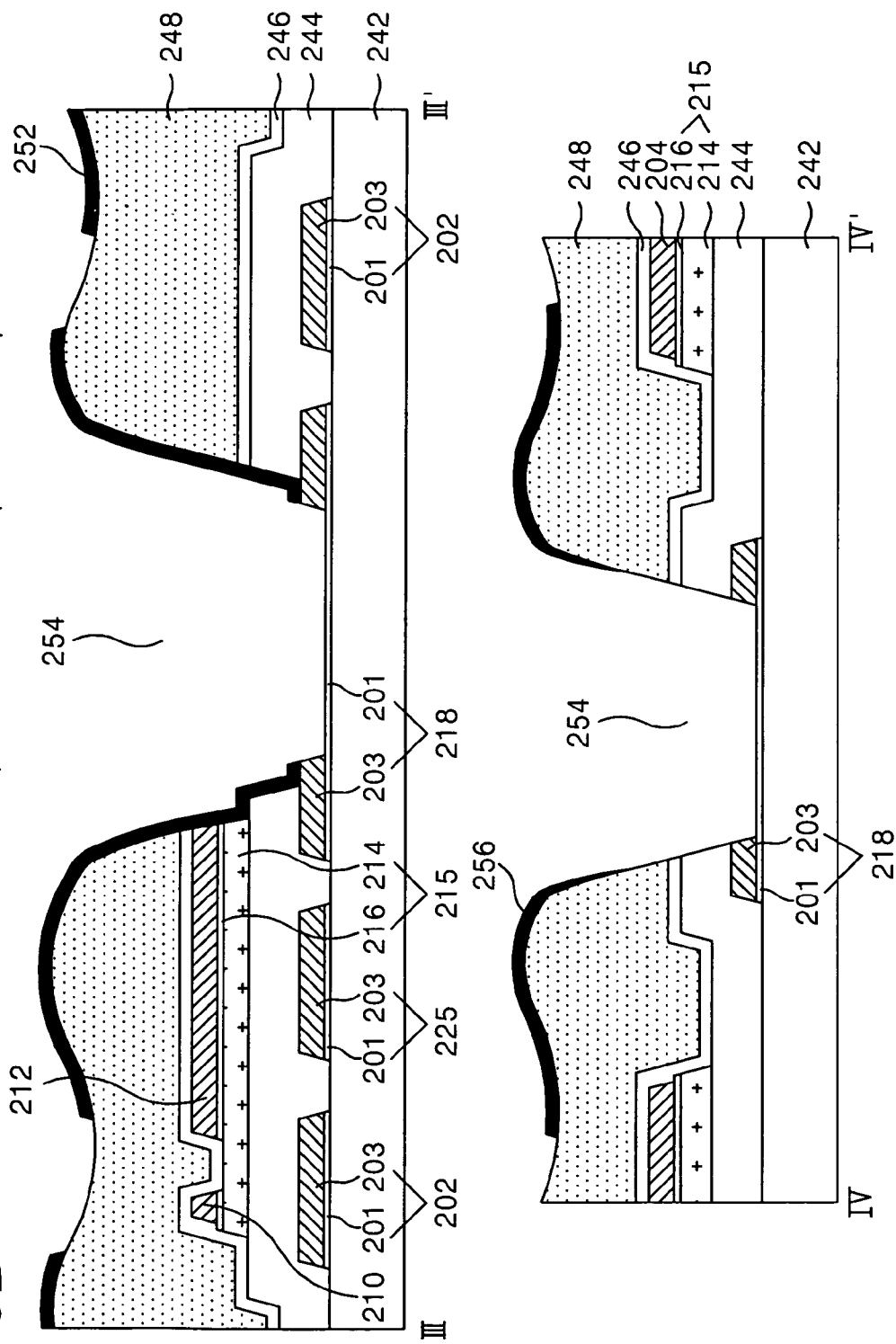

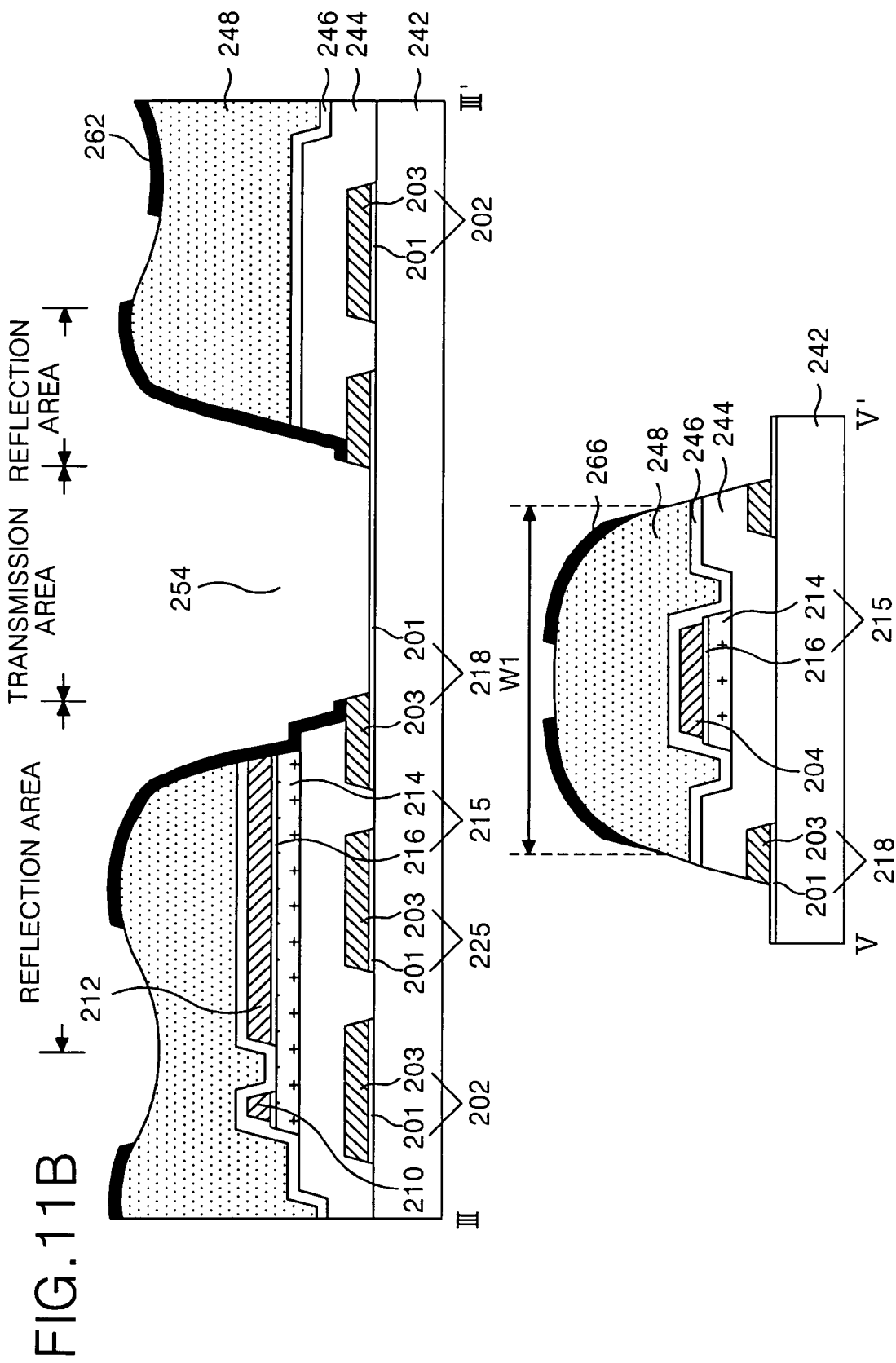

LIQUID CRYSTAL DISPLAY DEVICE AND METHOD FOR FABRICATING THE SAME

This application claims the benefit of Korean Patent Application No. P2004-112579 filed on 24 Dec. 2004, which is hereby incorporated by reference for all purposes as if fully set forth herein.

BACKGROUND OF THE INVENTION

1. Field of the Invention

The present invention relates to a liquid crystal display device, and more particularly to a transflective thin film transistor substrate that reduces parasitic capacitance, and a fabricating method thereof.

2. Discussion of the Related Art

A liquid crystal display device controls a light transmittance of a liquid crystal that has dielectric anisotropy, by use of an electric field, thereby displaying a picture. The liquid crystal display device includes a liquid crystal display panel for displaying a picture through a liquid crystal cell matrix and a drive circuit for driving the liquid crystal display panel.

Referring to FIG. 1, a liquid crystal display panel of the related art includes a color filter substrate 10 and a thin film transistor substrate 20 that are bonded together with a liquid crystal 24 therebetween.

The color filter substrate 10 includes a black matrix 4, a color filter 6, and a common electrode 8 that are sequentially formed on an upper glass substrate 2. The black matrix 4 is formed in a matrix shape on the upper glass substrate 2. The black matrix 4 divides an area of the upper glass substrate 2 into a plurality of cell areas where the color filters are to be formed, and the black matrix 4 prevents light interference between adjacent cells and an external light reflection. The color filter 6 is divided into red R, green G, and blue B in the cell areas divided by the black matrix 4. The common electrode 8 formed of a transparent conductive layer on the entire surface of the color filter 6 supplies a common voltage Vcom or a reference voltage when driving a liquid crystal 24. Also, an overcoat layer (not shown) might be further formed between the color filter 6 and the common electrode 8 to level the color filter 6.

The thin film transistor substrate 20 includes a thin film transistor 18 and a pixel electrode 22 that are formed at each cell area defined by the crossing of a gate line 14 and a data line 16 on a lower glass substrate 12. The thin film transistor 18 supplies a data signal from the data line 16 to the pixel electrode 22 in response to a gate signal of the gate line 14. The pixel electrode 22 formed of the transparent conductive layer supplies the data signal from the thin film transistor 18 to the liquid crystal 24.

The liquid crystal 24 having dielectric anisotropy controls the light transmittance by rotating the liquid crystals in accordance with an electric field formed by the data signal on the pixel electrode 22 and the common voltage Vcom of the common electrode 8.

The liquid crystal display panel further includes a spacer (not shown) for uniformly maintaining a cell gap between the color filter substrate 10 and the thin film transistor substrate 20.

The color filter substrate 10 and the thin film transistor substrate 20 of the liquid crystal display panel are formed by use of a plurality of mask processes. One mask process includes many processes such as depositing (coating) a thin film, cleaning, photolithography, etching, photo-resist stripping, inspecting, etc. Specifically, the thin film transistor substrate is manufactured using a semiconductor process and requires a plurality of mask processes, thus its fabricating process is complicated is a major contributor to the manufacturing cost of the liquid crystal display panel.

Further, the liquid crystal display panels are divided into three different types: a transmission type that displays a picture by use of a light incident from a backlight unit; a reflection type that displays a picture by reflecting an external light such as a natural light; and a transflective type that combines the transmission type and the reflection type.

There is a problem in that the transmission type display consumes too much power due to the backlight and the reflection type display cannot display a picture in a dark environment because the reflection type depends on the external light. But, the transflective type display operates in a reflection mode if the external light is sufficient and in a transmission mode using the backlight unit if the external light is not sufficient, thus the power consumption can be reduced versus the transmission type display and the transflective type display is not dependent on external light like the reflection type.

To this end, the transflective type liquid crystal display panel has each pixel divided into a reflection area and a transmission area. Accordingly, the transflective thin film transistor substrate should further include a reflection electrode formed in the reflection area, and an organic insulating film formed to be relatively thick under the reflection electrode in order to equalize a light path length of the reflection area to that of the transmission area. As a result, the number of mask processes increases, so that the related art transflective thin film transistor substrate has a problem in that its fabricating process is more complicated.

Further, the related art transflective thin film transistor substrate has a pixel electrode that overlaps both side parts of the data line, thus a parasitic capacitance is increased generating problems such as vertical cross talk, increased of power consumption etc.

FIG. 2 is a plan view illustrating a part of a transflective thin film transistor substrate according to the related art, and FIGS. 3 and 4 are cross sectional views illustrating the transflective thin film transistor substrate shown in FIG. 2, taken along the lines I-I', II-II'.

The transflective thin film transistor shown in FIGS. 2 to 4 includes: a gate line 102 and a data line 104 that are formed on a lower substrate 142 to cross each other with a gate insulating film therebetween to define a pixel area; a thin film transistor 106 connected to the gate line 102 and the data line 104; a reflection electrode 152 formed in a reflection area of each pixel; a pixel electrode 118 formed at each pixel area connected to the thin film transistor 106 through the reflection electrode 152; a storage upper electrode 122 connected to the pixel electrode 118 through the reflection electrode 152; and a storage capacitor 120 formed to overlap the pre-stage gate line 102.

The thin film transistor 106 includes a gate electrode 108 connected to the gate line 102; a source electrode 110 connected to the data line 104; a drain electrode 112 that faces the source electrode 110 and is connected to the pixel electrode 118; an active layer 114 that overlaps the gate electrode 108 with a gate insulating film 144 therebetween to form a channel between the source electrode 110 and the drain electrode 112; and an ohmic contact layer 116 formed on the active layer 114 except in the channel region for being in ohmic contact with the source electrode 110 and the drain electrode 112.

Herein, the gate line 102 and the gate electrode 108 has a double layer structure where a first conductive layer 101 of a transparent conductive layer is deposited and a second conductive layer 103 of a metal layer is deposited thereon.

Then, a semiconductor pattern 115 including the active layer 114 and the ohmic contact layer 116 is formed to overlap the data line 104.

The reflection electrode 152 formed in the reflection area has an embossed shape in accordance with a shape of an organic insulating film thereunder, thereby increasing the reflection efficiency by a scattering effect.

The pixel electrode 118 is connected to the drain electrode 112 through the reflection electrode 152 that is formed at each pixel area and passes through an edge area of a transmission hole 154. The pixel electrode 118 has a double layer structure where the first and second conductive layers 101, 103 are deposited like the gate line 102, and the second conductive layer 103 is opened in the transmission area leaving just the first conductive layer 101 of the transparent conductive layer exposed to a transmission area.

The transmission hole 154 is formed to penetrate from an organic insulating film to the gate insulating film in the transmission area. Accordingly, the length of the light path passing through a liquid crystal layer in the reflection area becomes equal to that in the transmission area, thus the transmission efficiency of the reflection mode becomes the same as that of the transmission mode.

The storage capacitor 120 is formed by connecting a storage upper electrode 122 to the pixel electrode 118 to overlap the pre-stage gate line 102 with the gate insulating film 144 therebetween. The storage upper electrode 122 is connected to the pixel electrode 118 through the reflection electrode 152 passing through an edge area of the transmission hole 154, and the semiconductor pattern 115 further overlaps with and under the storage upper electrode 122.

In this way, in the transflective thin film transistor substrate shown in FIGS. 2 to 4, the pixel electrode 118 with the double structure is formed together with the gate line 102, and the second conductive layer 103 is etched through the reflection electrode 152, and the first conductive layer 101 is exposed in the transmission area. Further, the pixel electrode 118 is connected to the drain electrode 112 and the storage upper electrode 122 through the reflection electrode 152. Accordingly, the transflective thin film transistor substrate may be formed by four mask processes.

On the other hand, as shown in FIG. 4, the reflection electrode 156 connected to the pixel electrode 118 overlaps both sides of the data line 104 with the organic insulating film 148 and a passivation film 146 in between, thus the parasitic capacitance Cdp1, Cdp2 is increased. The vertical cross talk and the electric power consumption are increased due to the increase of the parasitic capacitance Cdp1, Cdp2.

In order to solve this problem, the transflective thin film transistor substrate according to the present invention floats the reflection electrode that overlaps the data line, thereby decreasing the parasitic capacitance.

SUMMARY OF THE INVENTION

Accordingly, the present invention is directed to a liquid crystal display device and method for fabricating the same that substantially obviates one or more of the problems due to limitations and disadvantages of the related art.

An advantage of the present invention is to provide a transflective thin film transistor substrate that reduces a parasitic capacitance as well as simplifying its fabrication process, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, including: a gate line with a multi-layer structure having a transparent first conductive layer and an opaque second conductive layer; a data line crossing the gate line with a gate insulating film in between to define a pixel area; a thin film transistor connected to the gate line and the data line; a pixel electrode formed of the first conductive layer in the pixel area, wherein the second conductive layer remains along an edge of the first conductive layer at an edge of the pixel area; a transmission hole that penetrates from an organic insulating film on the thin film transistor to the gate insulating film to expose the first conductive layer of the pixel electrode; a reflection electrode on the organic insulating film extending along a part of a side surface of the transmission hole to connect the pixel electrode and a drain electrode of the thin film transistor; and a floating electrode on the organic insulating film that overlaps both sides of the data line.

In another aspect of the present invention, a liquid crystal display device, including: a gate line with a multi-layer structure having a transparent first conductive layer and an opaque second conductive layer; a data line crossing the gate line with a gate insulating film in between to define a pixel area; a thin film transistor connected to the gate line and the data line; a pixel electrode formed of the first conductive layer in the pixel area, wherein the second conductive layer remains along an edge of the first conductive layer at an edge of the pixel area; a transmission hole that penetrates from an organic insulating film on the thin film transistor to the gate insulating film to expose the first conductive layer of the pixel electrode; and a reflection electrode on the organic insulating film that does not overlap the data line and that extends along a side surface of the transmission hole to connect the pixel electrode and a drain electrode of the thin film transistor.

In another aspect of the present invention, a method of fabricating a liquid crystal display device, including: forming a first mask pattern group including a gate line, a gate electrode, and a pixel electrode having a double layer structure of a transparent first conductive layer and an opaque second conductive layer; forming a gate insulating film on the first mask pattern group, a semiconductor pattern on the gate insulating film, and a source/drain metal pattern having a data line, a source electrode and a drain electrode on the semiconductor pattern; forming an organic insulating film on the source/drain metal pattern; forming a transmission hole penetrating from the organic insulating film to the gate insulating film to expose the pixel electrode; forming a reflection electrode on the organic insulating film to extend along a part of a side surface of the transmission hole to connect the pixel electrode and the drain electrode, and a floating electrode on the organic insulating film that overlaps both sides of the data line; and removing the second conductive layer of the pixel electrode exposed through the reflection electrode and the floating electrode.

In another aspect of the present invention, a method of fabricating a liquid crystal display device, including: forming a first mask pattern group including a gate line, a gate electrode, and a pixel electrode having a double layer structure of a transparent first conductive layer and an opaque second conductive layer; forming a gate insulating film on the first mask pattern group, a semiconductor pattern on the gate insulating film, and a source/drain metal pattern having a data line, a source electrode, and a drain electrode on the semiconductor pattern; forming an organic insulating film on the source/drain metal pattern; forming a transmission hole penetrating from the organic insulating film to the gate insulating film to expose the pixel electrode; forming a reflection electrode on the organic insulating film that does not overlap the data line that extends along a side surface of the transmission hole to connect the pixel electrode and the drain electrode; and removing the second conductive layer of the pixel electrode exposed through the reflection electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a cross sectional view illustrating the transflective thin film transistor substrate shown in FIG. 5, taken along the line III-III', IV-IV';

FIGS. 7A and 7B are a plan view and a cross sectional view for explaining a first mask process of the transflective thin film transistor substrate according to the embodiment of the present invention;

FIGS. 8A and 8B are a plan view and a cross sectional view for explaining a second mask process of the transflective thin film transistor substrate according to the embodiment of the present invention;

FIGS. 10A and 10B are a plan view and a cross sectional view for explaining a fourth mask process of the transflective thin film transistor substrate according to the embodiment of the present invention;

FIGS. 11A and 11B are a plan view and a cross sectional view illustrating a transflective thin film transistor substrate according to a second embodiment of the present invention;

DETAILED DESCRIPTION OF THE ILLUSTRATED EMBODIMENTS

Reference will now be made in detail to the embodiments of the present invention, examples of which are illustrated in the accompanying drawings.

With reference to FIGS. 5 to 13B, embodiments of the present invention will be explained as follows.

Figure 5:
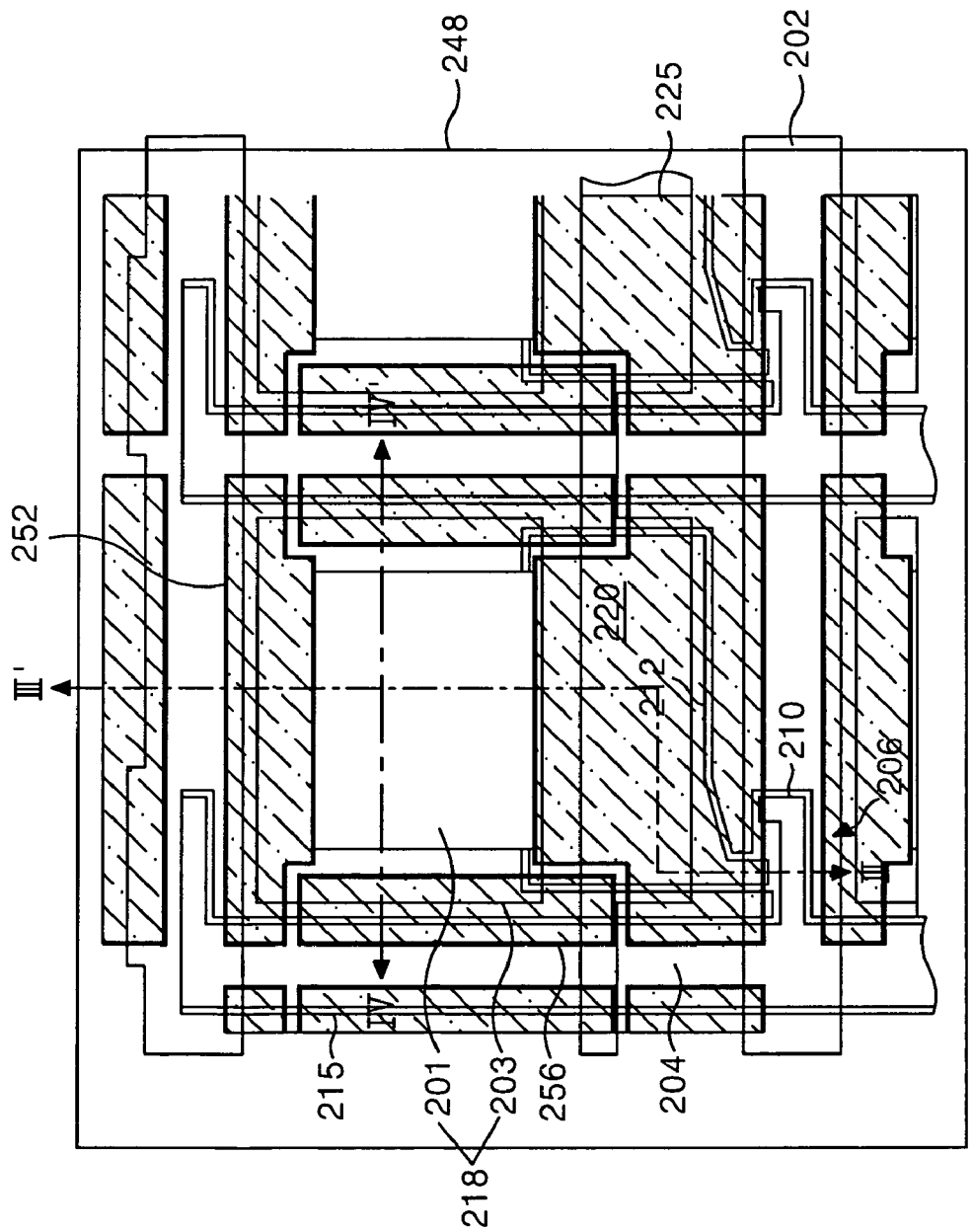
FIG. 5 is a plan view illustrating a part of a transflective thin film transistor substrate according to a first embodiment of the present invention.

FIG. 5 is a plan view illustrating a transflective thin film transistor substrate according to a first embodiment of the present invention. FIG. 6 is a cross sectional view illustrating the transflective thin film transistor substrate shown in FIG. 5, taken along the lines III-III', IV-IV'.

The transflective thin film transistor substrate shown in FIGS. 5 and 6 includes a gate line 202 and a data line 204 that are formed on a lower substrate 242 to cross each other with a gate insulating film 244 therebetween to define a pixel area; a thin film transistor 206 connected to the gate line 202 and the data line 204; first and second reflection electrodes 252, 256 formed in a reflection area of each pixel; a pixel electrode 218 formed at each pixel area to be connected to the thin film transistor 206 through the first reflection electrode 152; and a storage capacitor 220 formed by a storage line 225 overlapping a drain electrode 212.

The thin film transistor 206 includes a gate electrode 208 connected to the gate line 202; a source electrode 210 connected to the data line 204; a drain electrode 212 that faces the source electrode 210 and is connected to the pixel electrode 218; an active layer 214 that overlaps the gate electrode 208 with a gate insulating film 244 therebetween to form a channel between the source electrode 210 and the drain electrode 212; and an ohmic contact layer 216 formed on the active layer 214 except a channel part for being in ohmic contact with the source electrode 210 and the drain electrode 212. The thin film transistor 206 charges and sustains a video signal of the data line 204 on the pixel electrode 218 in response to a scan signal of the gate line 202.

Herein, the gate line 202 and the gate electrode 208 have a double layer structure where a first conductive layer 201 is a transparent conductive layer and a second conductive layer 203 is a metal layer thereon. Herein, the second conductive layer 203 might also be formed of a multi-layer structure where two or more metal layers are deposited.

A semiconductor pattern 215 having the active layer 214 and the ohmic contact layer 216 is formed to overlap the data line 204.

The pixel electrode 218 is formed a double layer structure where the first and second conductive layers 201, 203 are deposited together with the gate line 202 in each pixel area. The second conductive layer 203 of the pixel electrode 218 is removed within a transmission hole 254 to define a transmission area where the first conductive layer 201 is exposed. Further, the pixel electrode 218 is separated from the gate line 202 and also separated from the data line 204 without being overlapped therewith.

The transmission hole 254 is formed to penetrate a passivation film 246 and an organic insulating film 248 which are deposited to cover the thin film transistor 206 and the data line 204, and to penetrate the gate insulating film 244 under the passivation film 246 as well. The transmission hole 254 penetrates as far as the second conductive layer 203 of the pixel electrode 218 to expose the first conductive layer 201. Further, the transmission hole 254 exposes a side surface of the drain electrode 212. The organic insulating film 248 is formed to have an embossed surface.

The first and second reflection electrode 252, 256 are separated for each pixel area and are formed on the organic insulating film to define a reflection area that reflects an external light. The first reflection electrode 252 located in upper and lower parts of the transmission hole 254 overlaps a part of the gate line 202 and is extended along the side surface of the transmission hole 254 to be connected to the pixel electrode 218. The first reflection electrode 252 encompassing the lower side surface of the transmission hole 254 connects the drain electrode 212 and the pixel electrode 218. The first reflection electrode 252 projects at both side parts to overlap both side parts of the data line. A second reflection electrode 256 located at both sides of the transmission hole 254 overlaps both sides of the data line 204 to be floated. That is to say, the second reflection electrode 256 overlaps both sides of the data line 204 and is extended along the side surface of the transmission hole 254, but the second reflection electrode 256 is not connected to the pixel electrode 218 so that it floats. Accordingly, the parasitic capacitance Cdp1, Cdp2 formed by the overlapping of the second reflection electrode 256 and the data line 204 is decreased. The second reflection electrode 256 overlaps the data line 204 between projected parts of the first reflection electrode 252. The first and second reflection electrodes 252 and 256 have an embossed shape in accordance with the shape of the organic insulating film 248 thereunder, thereby increasing the reflection efficiency by a scattering effect.

The second conductive layer 203 of the pixel electrode 218 is etched by using the first and second reflection electrodes 252, 256 as a mask. Accordingly, the first reflection electrode 252 is connected to the second conductive layer 203 of the pixel electrode 218, thus a contact resistance may be reduced. For example, in the case of using AlNd for the first and second reflection electrode 252, 256, ITO for the pixel electrode 218, and Mo for the second conductive layer 203, AlNd and ITO can only be connected through Mo, thus it is possible to prevent an increase of a contact resistance between AlNd and ITO caused by the generation of Al2O3.

The pixel electrode 218 generates a potential difference with the common electrode of the color filter substrate (not shown) by the pixel signal supplied through the thin film transistor. The liquid crystal having dielectric anisotropy rotates by the potential difference to control a transmittance of a light passing through the liquid crystal layer of each of the reflection area and the transmission area, thus the brightness is changed in accordance with the video signal.

In this case, the length of the light path passing through the liquid crystal layer in the reflection area becomes equal to that in the transmission area by the transmission hole 254 that penetrates the relatively thick organic insulating film 248. Specifically, a path that the ambient light incident in the reflection area passes through is the same in length as a path that the transmitted light of the backlight unit incident to the transmission area passes through the liquid crystal layer, thus the transmission efficiency of the reflection mode is the same as that of the transmission mode.

The storage capacitor 220 is formed by the storage line 223 overlapping the drain electrode 212 with the gate insulating film 244. Herein, the drain electrode 212 extends from the thin film transistor 206 to overlap the storage line 225 with the semiconductor pattern 215 and has its side surface exposed through the transmission hole 254 to be connected to the first reflection electrode 252 that is connected to the pixel electrode 218. The storage line 225 is formed in a double structure where the first and second conductive layers 201, 203 are deposited on the substrate 242 like the gate line 202.

In the transflective thin film transistor substrate according to the first embodiment of the present invention, the first reflection electrode 252 overlapped with both sides of gate line 202 connects the pixel electrode and the drain electrode 212 through the side surface of the transmission hole 254. But on the other hand, the second reflection electrode 256 overlapped with both sides of the data line 204 is opened with the pixel electrode 218 to be floated. Accordingly, the parasitic capacitance Cdp1, Cdp2 caused by the second reflection electrode 256 overlapping the data line 204 is decreased, thereby enabling the vertical cross talk and the electric current consumption to decrease.

The transflective thin film transistor substrate according to the first and second embodiments of the present invention is formed by four mask processes as follows.

FIGS. 7A and 7B illustrate a plan view and a cross sectional view for explaining a first mask process in a fabricating method of a transflective thin film transistor substrate according to an embodiment of the present invention.

A gate pattern having the gate line 202, the gate electrode 208, the storage line 225 and the pixel electrode 218 is formed on the lower substrate 242 by a first mask process. The gate pattern is formed in a double layer structure where the first and second conductive layers 201, 203 are deposited.

Specifically, the first and second conductive layers 210, 203 are deposited on the lower substrate 242 by a deposition method such as sputtering. The deposited first and second conductive layers 201, 203 are patterned by a photolithography process and an etching process using a first mask, thereby forming a first mask pattern group having the gate line 202, the gate electrode 208, the storage line 225, and the pixel electrode 218. The first conductive layer 201 may be formed of a transparent conductive material such as ITO, TO, ITZO, IZO, etc. The second conductive layer 203 may be formed in a single layer of a metal material such Mo, Ti, Cu, AlNd, Al, Cr, Mo alloy, Cu alloy, Al alloy, etc, or in a structure that includes two or more layers such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc.

Figure 8B:
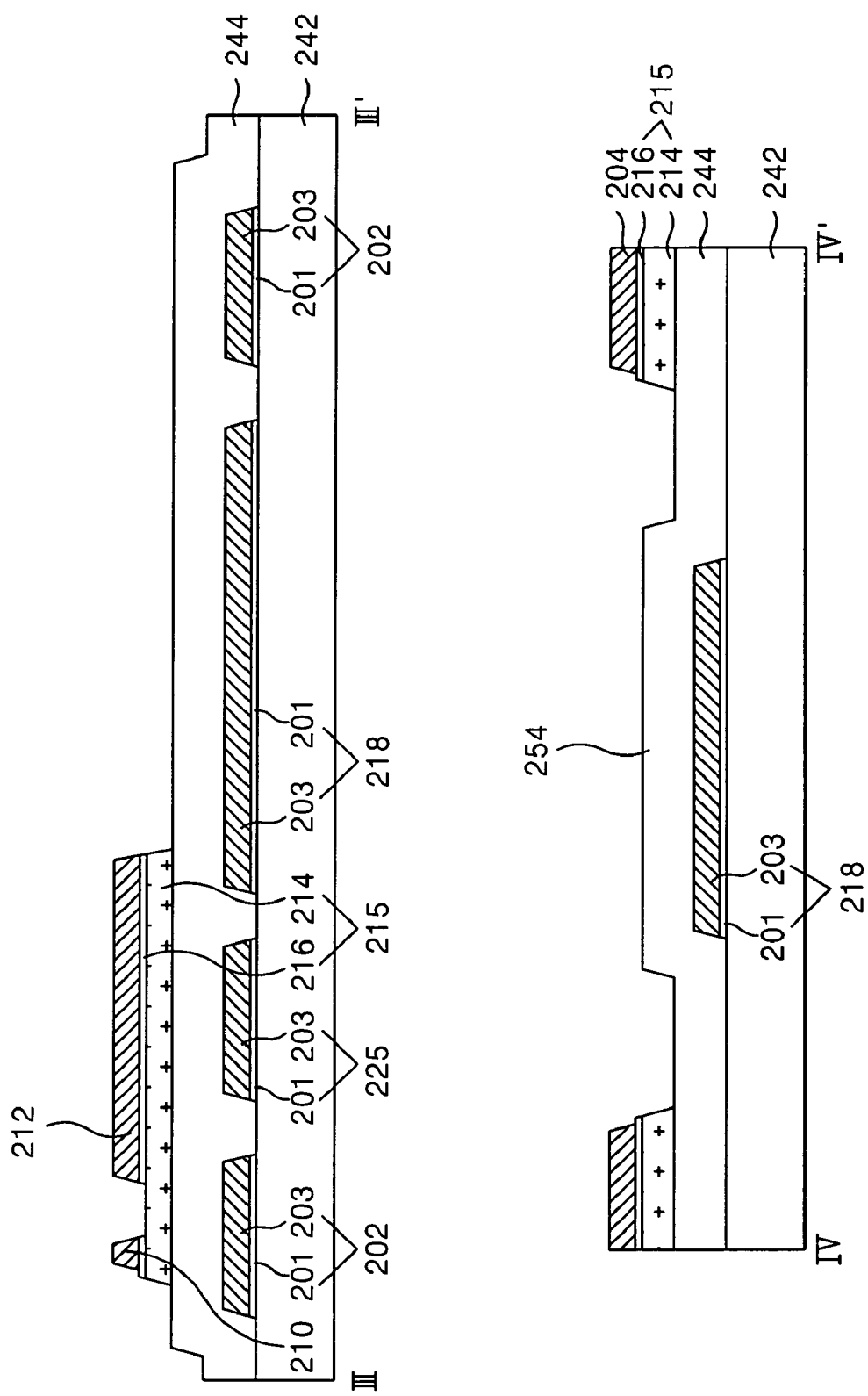

FIGS. 8A and 8B illustrate a plan view and a sectional view for explaining a second mask process in the fabricating method of the thin film transistor substrate according to an embodiment of the present invention.

A gate insulating film 224 is formed on the lower substrate 242 where the first mask pattern group is formed, and a second mask pattern group having a source/drain metal pattern having the data line 204, the source electrode 210 and the drain electrode 212 and a semiconductor pattern 215 having the active layer 214 and the ohmic contact layer 216 that overlap along the rear surface of the source/drain metal pattern are formed thereon by a second mask process. The second mask pattern group is formed by one mask process using a diffractive exposure mask.

Specifically, the gate insulating film 244, an amorphous silicon layer, an amorphous silicon layer doped with impurities (n+ or p+), and a source/drain metal layer are sequentially formed on the lower substrate 242 where the first mask pattern group is formed. For example, the gate insulating film 244, the amorphous silicon layer, and the amorphous silicon layer doped with impurities (n+ or p+) may be formed by a PECVD method, and the source/drain metal layer may be formed by a sputtering method. The gate insulating film 244 may be formed of an inorganic insulating material such as silicon oxide SiOx, silicon nitride SiNx, etc. The source/drain metal layer may be formed in a single layer of a metal material such as Mo, Ti, Cu, AlNd, Al, Cr, Mo alloy, Cu alloy, Al alloy, etc, or in a structure that includes two or more layers such as Al/Cr, Al/Mo, Al(Nd)/Al, Al(Nd)/Cr, Mo/Al(Nd)Mo, Cu/Mo, Ti/Al(Nd)/Ti, Mo/Al, Mo/Ti/Al(Nd), Cu alloy/Mo, Cu alloy/Al, Cu alloy/Mo alloy, Cu alloy/Al alloy, Al/Mo alloy, Mo alloy/Al, Al alloy/Mo alloy, Mo alloy/Al alloy, Mo/Al alloy, etc.

A photo-resist pattern having a step difference is formed on the source/drain metal layer by the photolithography process using a diffractive exposure mask. The photo-resist pattern is formed to be relatively thicker in an area where the semiconductor pattern and the source/drain pattern are to be formed, and to be relatively thinner in an area where a channel of the thin film transistor is to be formed.

The source/drain metal pattern including the data line 204 and the drain electrode 212 integrated with the source electrode 210, and the semiconductor pattern 215 thereunder are formed by an etching process using the photo-resist pattern that has such a step difference. Herein, the drain electrode 212 overlaps the storage line 225 together with the semiconductor pattern 215 to form the storage capacitor 220.

Then, a thin part of the photo-resist pattern is removed and a thick part thereof becomes thin by an ashing process. The source electrode 210 and the drain electrode 212 are separated by the etching process using the ashed photo-resist pattern, and the ohmic contact layer 216 thereunder is removed. Subsequently, the photo-resist pattern remaining on the source/drain metal pattern is removed by a stripping process.

Figure 9A:
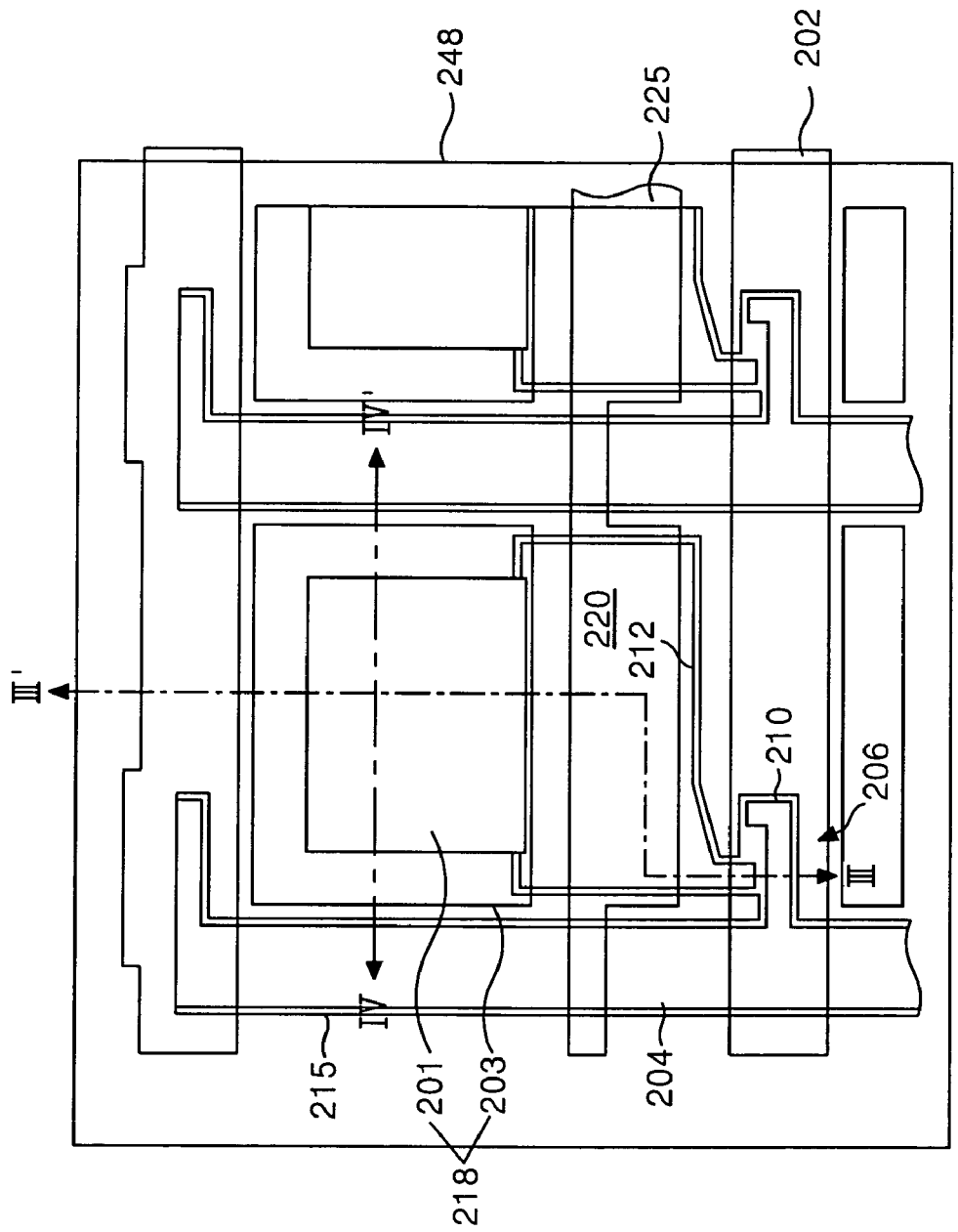
FIGS. 9A and 9B are a plan view and a cross sectional view for explaining a third mask process of the transflective thin film transistor substrate according to the embodiment of the present invention.
Figure 9B:
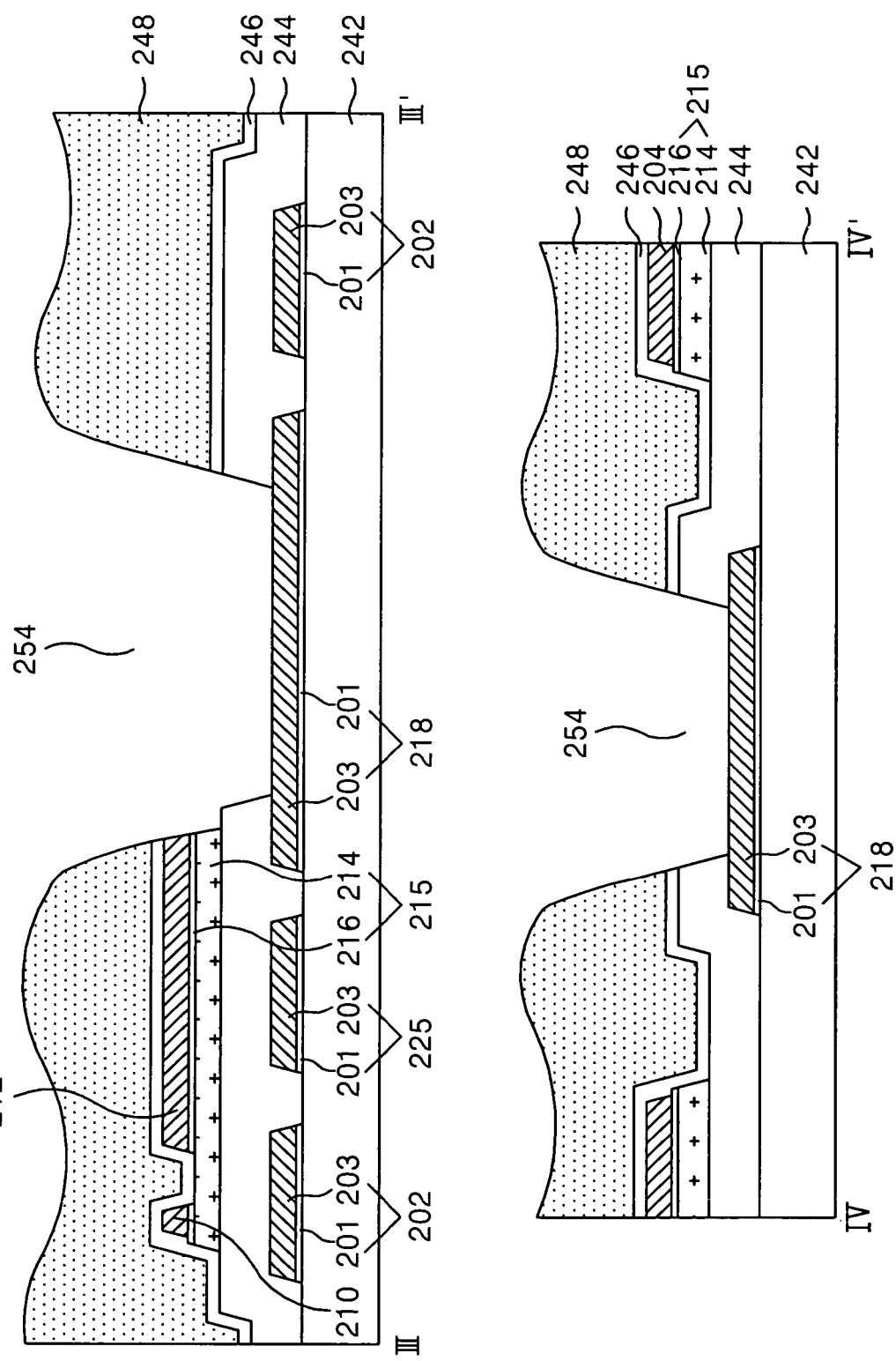

FIGS. 9A and 9B are a plan view and a cross sectional view for explaining a third mask process in the fabricating method of the thin film transistor according to the embodiment of the present invention.

A passivation film 246 and an organic insulating film 248 are formed on the gate insulating film 244 where the second mask pattern group is formed, by a third mask process, and the transmission hole penetrating the passivation film 246 and the organic insulating film 248 is formed in each pixel area. The passivation film 246 may formed of an inorganic insulating material like the gate insulating film. The organic insulating film 248 is formed by coating a photosensitive organic material like photo acryl on the passivation film 246 by a spin coating method, etc.

Then, the organic insulating film 248 is patterned by the photolithography process using the third mask, thereby forming the transmission hole 254 that penetrates the organic insulating film 248 in the transmission area corresponding to a transmission area of the third mask. Further, the remaining area except the transmission part of the third mask has a structure where a shielding area and a diffractive exposure area (or transflective area) are repeated, and corresponding thereto, the organic insulating film 248 is patterned in a structure where a shielding area (projected part) and a diffractive exposure area (groove part) having the step difference are repeated in a reflection area. Subsequently, the organic insulating film 248 where the projected part and the groove part are repeated is baked to make the organic insulating film 248 have an embossed shape in its surface in the reflection area.

Subsequently, the passivation film 246 and the gate insulating film 244 thereunder are patterned by the etching process, e.g., dry etching, using the organic insulating film 248 as a mask, thus the transmission hole 254 penetrates as far as the gate insulating film 244. At this moment, the drain electrode 212 exposed through the transmission hole 254 and the semiconductor pattern 215 thereunder are also etched. Herein, the side surface of the gate insulating film 244 has a structure projecting further than the drain electrode 212 and the semiconductor pattern 215 thereunder due to an etching speed difference. The transmission hole 254 exposes the second conductive layer 203 of the pixel electrode 218 and the side surface of the drain electrode 212 is exposed through the side surface thereof.

FIGS. 10A and 10B illustrate a plan view and a cross sectional view for explaining a fourth mask process in the fabricating method of the thin film transistor according to the embodiment of the present invention.

The first and second reflection electrodes 252, 256 are formed by a fourth mask process, and the first conductive layer 201 of the pixel electrode 218 is exposed within the transmission hole 254 through aperture parts of the first and second reflection electrodes 252, 256.

Specifically, a reflective metal layer is formed on the organic insulating film 248 having the embossed surface while keeping the embossed shape. The reflective metal layer is formed in a single layer structure with a high reflectability, such as Al, AlNd, etc, or in a double layer structure such as AlNd/Mo, etc. Then, the reflective metal layer is patterned by the photolithography process and the etching process using the fourth mask, thereby forming the first and second reflection electrode 252, 256 at the reflection area of each pixel. At this moment, the second conductive layer 203 of the pixel electrode 218 that is exposed through the transmission hole 254 is etched together with the reflective metal layer that is deposited thereon, thereby exposing the first conductive layer 201 of the pixel electrode 218. The first reflection electrode 252 located at the upper and lower parts of the transmission hole 254 overlaps a part of the gate line 202 and is extended along the side surface of the transmission hole 254 to connect the drain electrode 212 and the pixel electrode 218. The first reflection electrode 252 is surface-connected to the second conductive layer 203 that remains behind along the edge of the first conductive layer 201 of the pixel electrode 218, and might also project at both sides thereof to overlap with both side parts of the data line 204. The second reflection electrode 256 located at both sides of the transmission hole 254 overlaps both side parts of the data line to be floated.

In this way, the fabricating method of the transflective thin film transistor substrate according to the first embodiment of the present invention uses four mask processes, thus the process may be simplified.

Figure 11A:
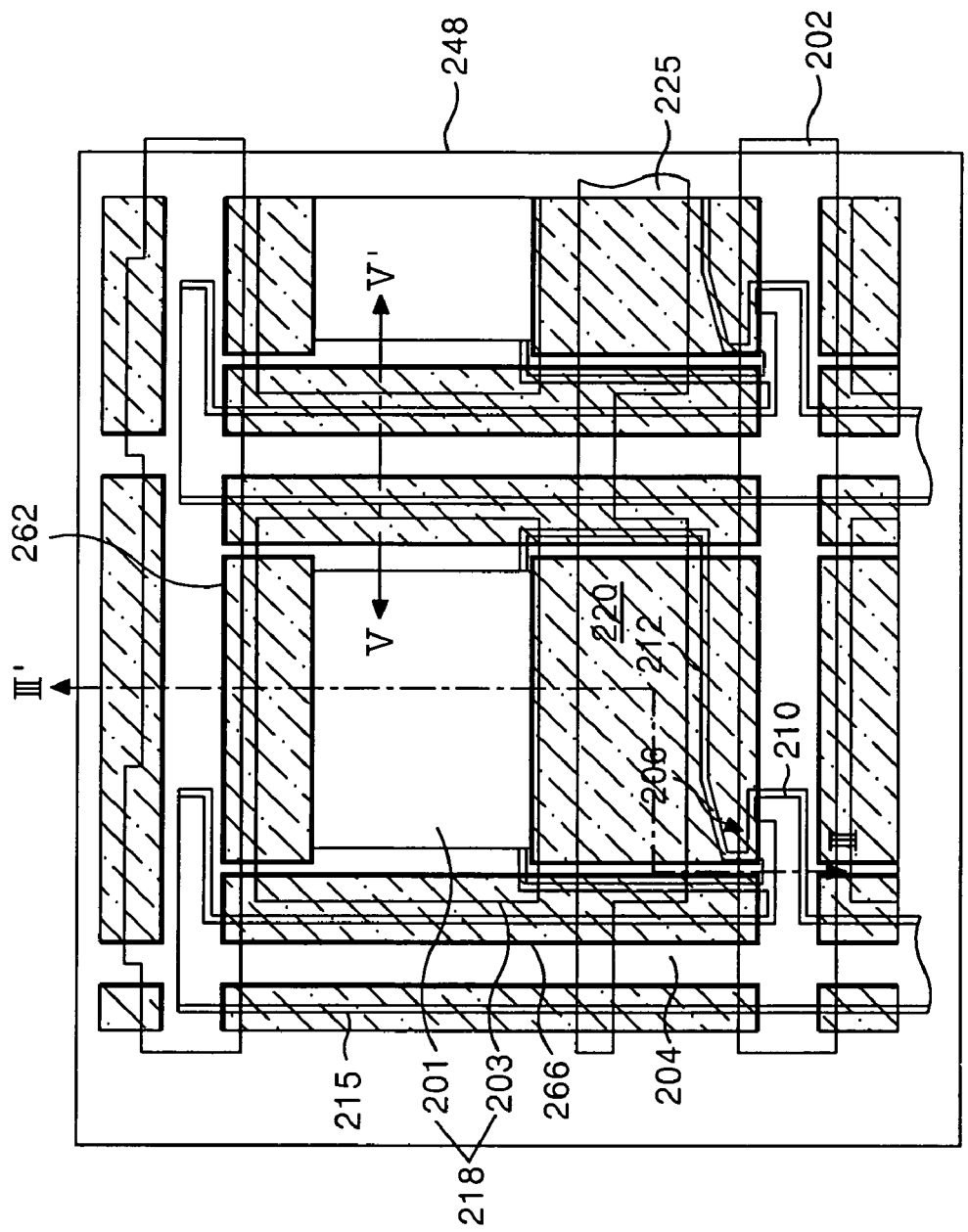

FIG. 11A is a plan view illustrating a part of a transflective thin film transistor substrate according to a second embodiment of the present invention. FIG. 11B is a cross sectional view illustrating a transflective thin film transistor substrate shown in FIG. 11A, taken along the lines III-III', V-V'.

The transflective thin film transistor substrate shown in FIGS. 11A and 11B includes the same components as the thin film transistor substrate shown in FIGS. 5 and 6 except that a first reflection electrode 262 does not overlap the data line 204 and only a floated second reflection electrode 266 overlaps the both side parts of the data line 204, and is formed by the foregoing four mask processes. Accordingly, a detail description for the repeated components will be omitted.

The first reflection electrode 262 connected to the pixel electrode 218 overlaps the both side parts of the gate line and does not overlap the data line 204. The floated second reflection electrode 266 overlaps both sides of the data line 204, and is formed long along the data line 204. Accordingly, the data line 204 is only overlapped with the floated second reflection electrode 266, thus the parasitic capacitance Cdp1, Cdp2 is further reduced to make it possible to further decrease the vertical cross talk and the electric current consumption.

Figure 12A:
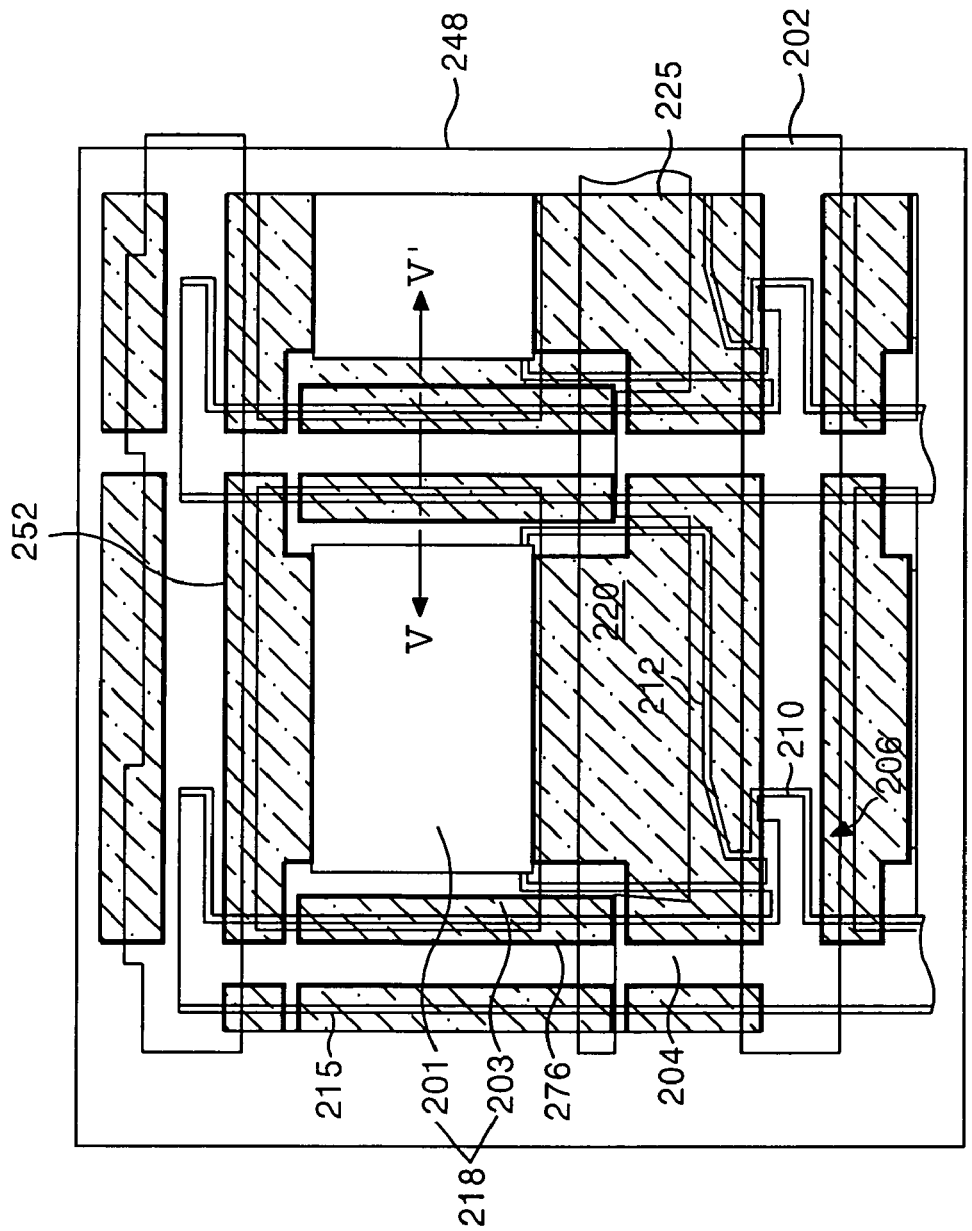
FIGS. 12A and 12B are a plan view and a cross sectional view illustrating a transflective thin film transistor substrate according to a third embodiment of the present invention.
Figure 12B:
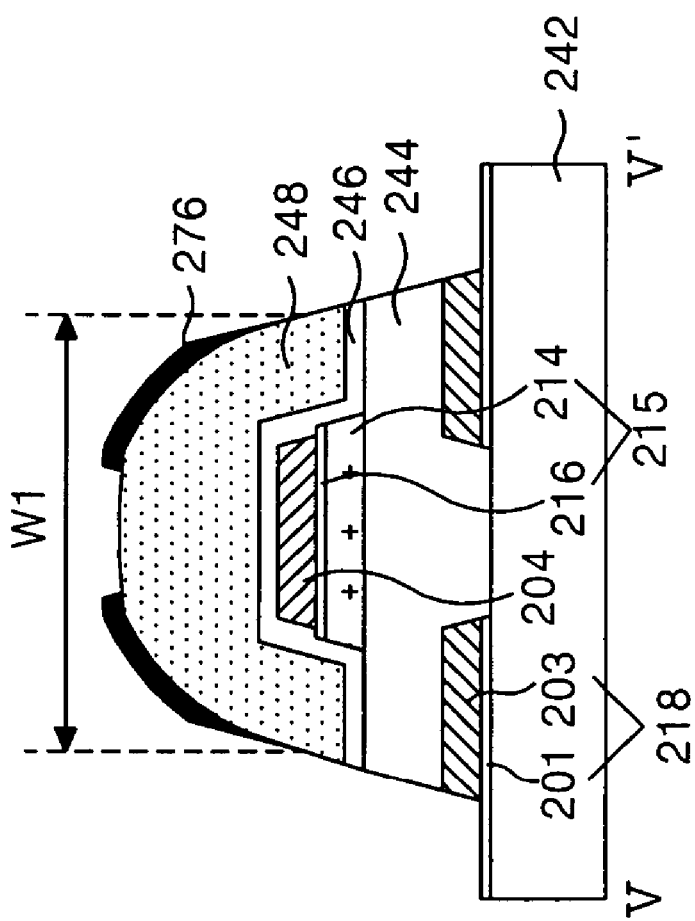

FIG. 12A is a plane view illustrating a part of a transflective thin film transistor substrate according to a third embodiment of the present invention, and FIG. 12B is a cross sectional view illustrating the transflective thin film transistor substrate shown in FIG. 12A, taken along the line V-V'.

The transflective thin film transistor substrate shown in FIGS. 12A and 12B includes the same components as the transflective thin film transistor substrate shown in FIGS. 11A and 11B except that the pixel electrode 218 overlaps the both side parts of the data line 204 to decrease a line width of a second reflection electrode 276, and is formed by the foregoing four mask processes. Accordingly, a detailed description of the repeated components will be omitted.

The pixel electrode 218 overlaps the both side parts of the data line 204. At this moment, a part where the first and second conductive layers 201, 203 are deposited in the pixel electrode 218 overlaps the both side parts of the data lien 204. Accordingly, it is possible to decrease the line width of the second reflection electrode 276 that overlaps both side parts of the data line 204 and is floated, without considering light leakage. Accordingly, a distance W2 having the line width of the two second reflection electrodes 276 in FIG. 12B may be known to be more decreased than a distance W1 having the line width of the two second reflection electrodes 276 that overlap both sides of the data line 204 in FIG. 11B. As a result, the transmission aperture ratio by which the first conductive layer of the pixel electrode is exposed may be improved as much as the line width of the second reflection electrode 276 is decreased.

Figure 13A:
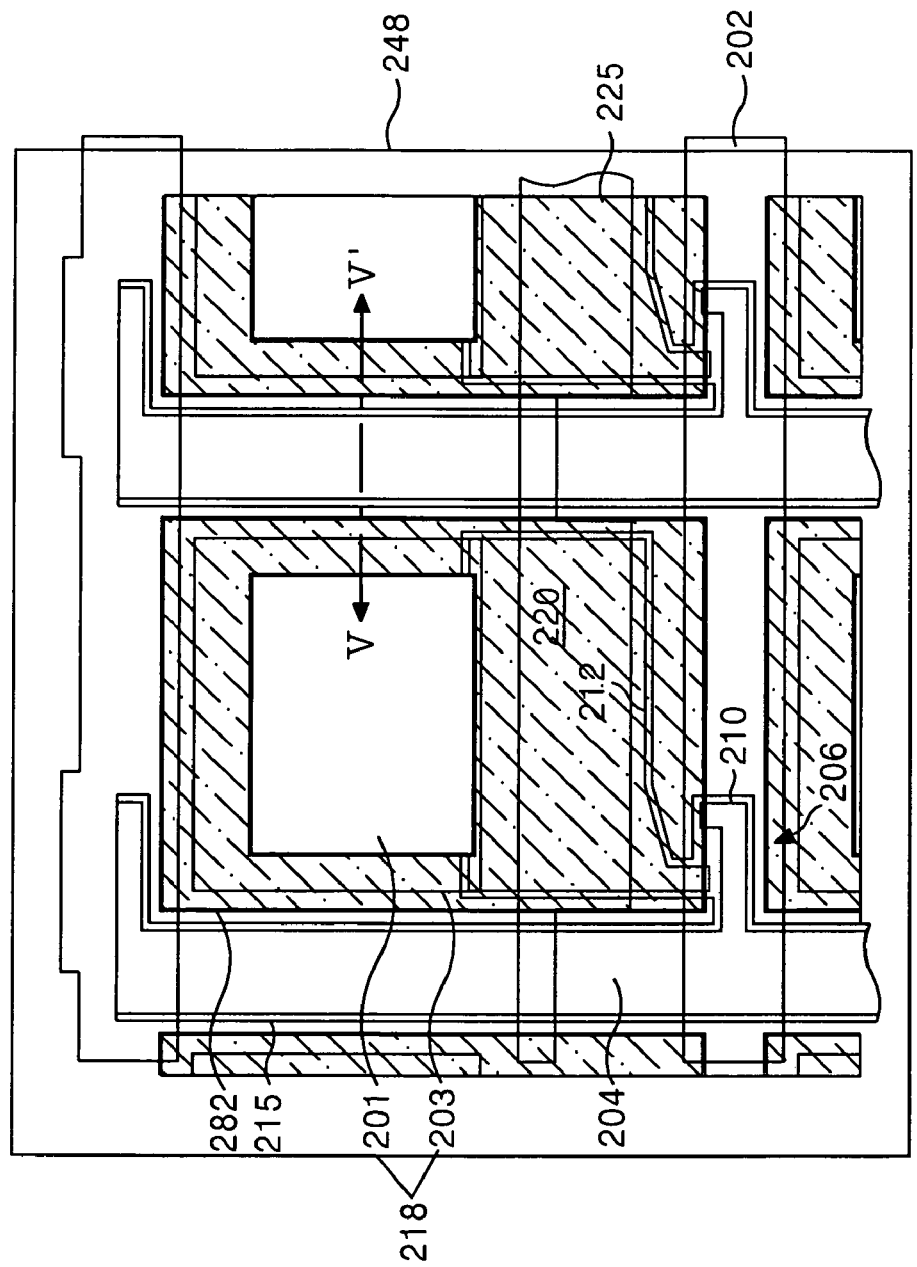
FIGS. 13A and 13B are a plan view and a cross sectional view illustrating a transflective thin film transistor substrate according to a fourth embodiment of the present invention.
Figure 13B:
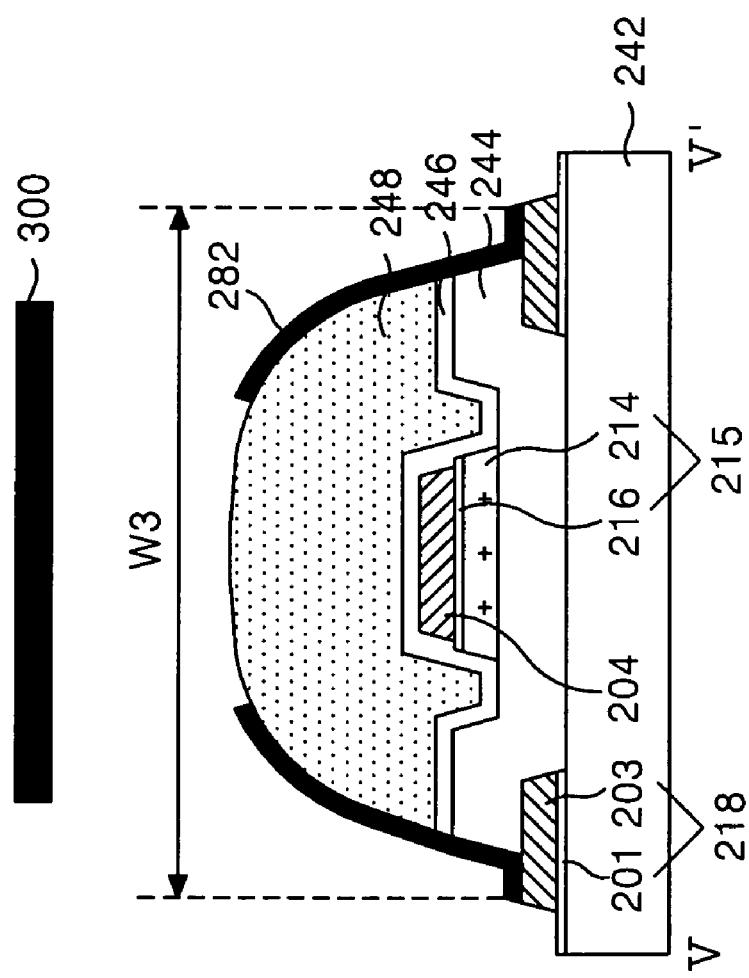

FIG. 13A is a plane view illustrating a part of a transflective thin film transistor substrate according to a fourth embodiment of the present invention, and FIG. 13B is a cross sectional view illustrating the transflective thin film transistor substrate shown in FIG. 13A, taken along the line V-V'.

Figure 1:
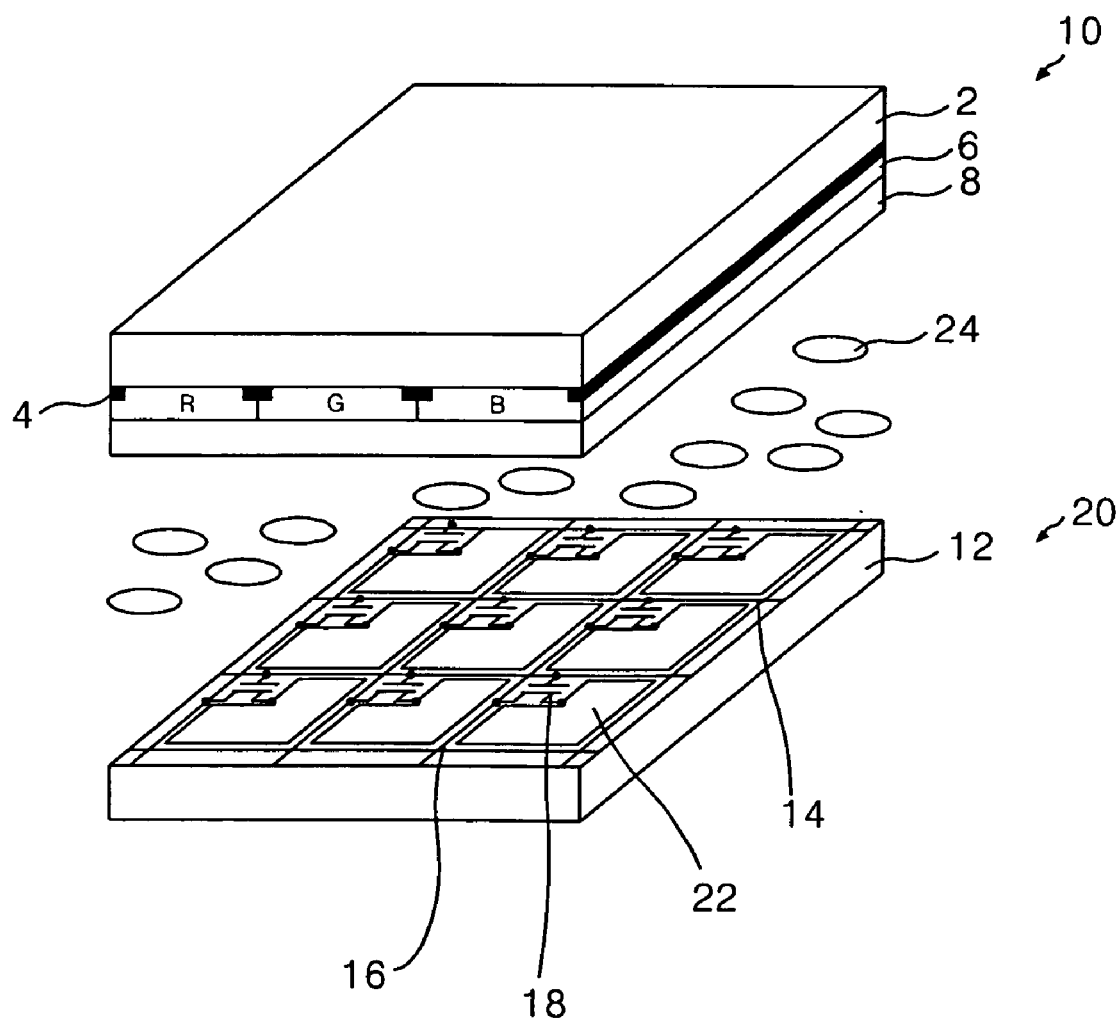
FIG. 1 is a perspective view briefly illustrating a liquid crystal display panel structure of the related art.
Figure 2:
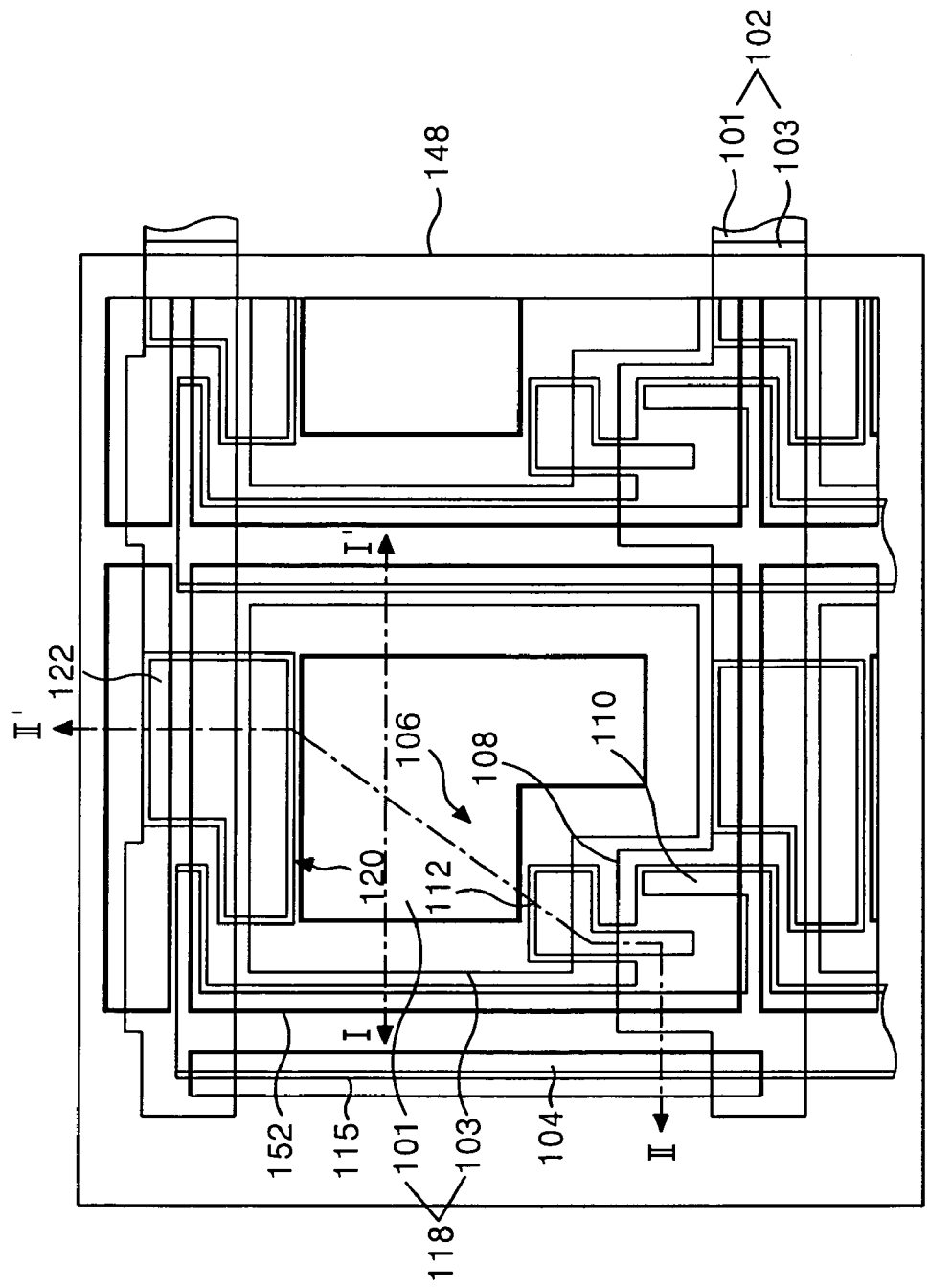
FIG. 2 is a plan view partially illustrating a transflective thin film transistor substrate of the previously applied invention.
Figure 3:
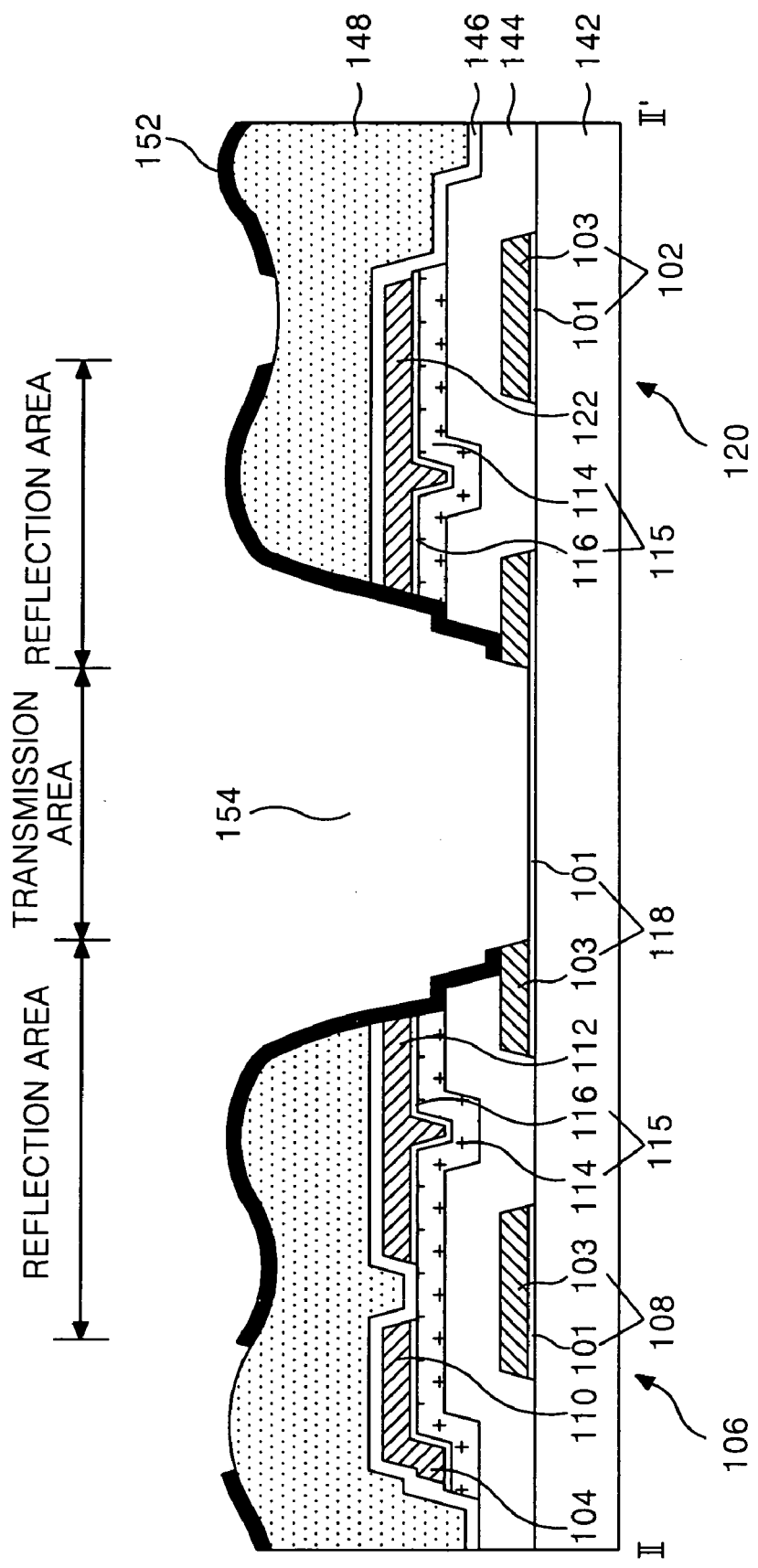
FIG. 3 is a cross sectional view illustrating the transflective thin film transistor substrate shown in FIG. 2, taken along the line II-II'.
Figure 4:
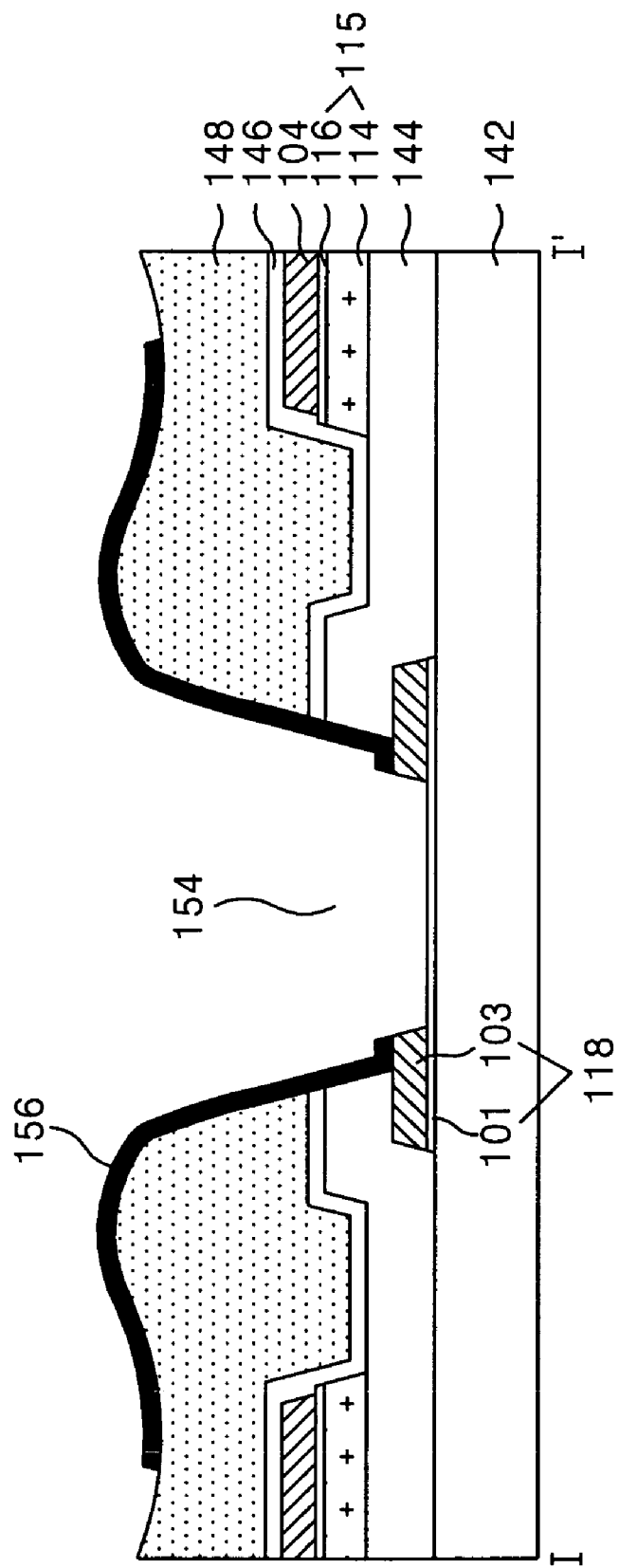
FIG. 4 is a cross sectional view illustrating the transflective thin film transistor substrate shown in FIG. 2, taken along the line I-I'.

The transflective thin film transistor substrate shown in FIGS. 13A and 13B includes the same components as the transflective thin film transistor substrate shown in FIGS. 2 and 3 except that a reflection electrode 282 is separated from the both side parts of the data line 204 without being overlapped and is connected to the pixel electrode 218 through the transmission hole 254, and is formed by the foregoing four mask processes. Accordingly, a detailed description of the repeated components will be omitted.

The reflection electrode 282, as shown in FIGS. 2 and 3, encompasses the side surface of the transmission hole 254 to be connected to the pixel electrode 218, but on the other hand, the reflection electrode 282 is separated from the data line 204 without overlapping therewith. Accordingly, the parasitic capacitance Cdp1, Cdp2 caused by the overlapping of the reflection electrode 282 and the data line 204 is decreased to make it possible to reduce the vertical cross talk and the electric current consumption. In this case, in order to prevent the light leakage cause by the separation of the reflection electrode 282 and the data line 204, a black matrix 300 is added to the color filter substrate. The black matrix 300 overlaps the data line 204 and overlaps a part of the reflection electrode 282 to prevent the light leakage.

As described above, the transflective thin film transistor substrate and the fabricating method thereof according to the present invention divides the reflection electrode formed in the pixel area into the first reflection electrode that connects the pixel electrode and the drain electrode exposed through the transmission hole and the second reflection electrode that overlaps both sides of the data line and is floated, even while simplifying the process of the four mask processes.

Further, the transflective thin film transistor substrate and the fabricating method thereof according to the present invention forms the reflection electrode connected to the pixel electrode so that the reflection electrode does not overlap the data line.

Accordingly, the parasitic capacitance caused by the overlapping of the reflection electrode and the data line is decreased so as to reduce the vertical cross talk and the electric power consumption.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a gate line with a multi-layer structure having a transparent first conductive layer and an opaque second conductive layer;
   a data line crossing the gate line with a gate insulating film in between to define a pixel area;
   a thin film transistor connected to the gate line and the data line;
   a pixel electrode formed of the first conductive layer in the pixel area, wherein the second conductive layer remains along an edge of the first conductive layer at an edge of the pixel area;
   a transmission hole that penetrates from an organic insulating film on the thin film transistor to the gate insulating film to expose the first conductive layer of the pixel electrode;
   a reflection electrode on the organic insulating film extending along a part of a side surface of the transmission hole to connect the pixel electrode and a drain electrode of the thin film transistor; and
   a floating electrode on the organic insulating film that overlaps both sides of the data line.

2. The device according to claim 1, further including:
   a storage line substantially parallel to the gate line; and
   a storage capacitor with a drain electrode extended from the thin film transistor overlapping with the storage line with the gate insulating film in between.

3. The device according to claim 1, wherein the organic insulating film under the reflection electrode and the floating electrode has an embossed surface so that the reflection electrode and the floating electrode have an embossed shape.

4. The device according to claim 1, further including:
   a passivation film formed between the thin film transistor and the organic insulating film, formed of an inorganic insulating film.

5. The device according to claim 1, wherein the reflection electrode overlaps both sides of the gate line and extends along a side surface of the transmission hole that is adjacent to the gate line and connected to the pixel electrode.

6. The device according to claim 5, wherein the reflection electrode is connected to a side surface of the drain electrode exposed through the transmission hole and is connected to the second conductive layer of the pixel electrode exposed through the transmission hole.

7. The device according to claim 5, wherein both sides of the reflection electrode are projected to overlap the data line.

8. The device according to claim 7, wherein the floating electrode overlaps the data line between projected parts of the reflection electrode.

9. The device according to claim 1, wherein the floating electrode is along the data line and is separated from a floating electrode of an adjacent pixel area.

10. The device according to claim 1, wherein the floating electrode extends along a side surface of the transmission hole that is adjacent to the data line and the floating electrode is opened with the pixel electrode.

11. The device according to claim 1, wherein the floating electrode overlaps with the gate line and the data line.

12. The device according to claim 1, wherein the pixel electrode overlaps with both sides of the data line.

13. The device according to claim 1, wherein the pixel electrode is separated from the data line without overlapping the data line.

14. The device according to claim 1, wherein the second conductive layer has a multi-layer structure of two or more layers.

15. A liquid crystal display device, comprising:
a gate line with a multi-layer structure having a transparent first conductive layer and an opaque second conductive layer;
a data line crossing the gate line with a gate insulating film in between to define a pixel area;
a thin film transistor connected to the gate line and the data line;
a pixel electrode formed of the first conductive layer in the pixel area, wherein the second conductive layer remains along an edge of the first conductive layer at an edge of the pixel area;
a transmission hole that penetrates from an organic insulating film on the thin film transistor to the gate insulating film to expose the first conductive layer of the pixel electrode; and
a reflection electrode on the organic insulating film that does not overlap the data line and that extends along a side surface of the transmission hole to connect the pixel electrode and a drain electrode of the thin film transistor.

16. The device according to claims 15, further including:
a storage line substantially parallel to the gate line; and
a storage capacitor formed with a drain electrode extended from the thin film transistor overlapping with the storage line with the gate insulating film in between.

17. The device according to claim 15, further including:
a passivation film formed between the thin film transistor and the organic insulating film, formed of an inorganic insulating film.

18. The device according to claim 15, further comprising a black matrix on a color filter substrate that blocks a light leakage through an area between the reflection electrode and the data line.

19. The device according to claim 15, wherein the second conductive layer has a multi-layer structure of two or more layers.

20. A method of fabricating a liquid crystal display device, comprising:
forming a first mask pattern group including a gate line, a gate electrode, and a pixel electrode having a double layer structure of a transparent first conductive layer and an opaque second conductive layer;
forming a gate insulating film on the first mask pattern group, a semiconductor pattern on the gate insulating film, and a source/drain metal pattern having a data line, a source electrode and a drain electrode on the semiconductor pattern;
forming an organic insulating film on the source/drain metal pattern;
forming a transmission hole penetrating from the organic insulating film to the gate insulating film to expose the pixel electrode;
forming a reflection electrode on the organic insulating film to extend along a part of a side surface of the transmission hole to connect the pixel electrode and the drain electrode, and a floating electrode on the organic insulating film that overlaps both sides of the data line; and
removing the second conductive layer of the pixel electrode exposed through the reflection electrode and the floating electrode.

21. The method according to claim 20, wherein forming the organic insulating film further includes:
forming a passivation film on the source/drain metal pattern.

22. The method according to claim 20, wherein the organic insulating film has an embossed surface.

23. The method according to claim 20, further including:
forming a storage line substantially parallel to the gate line; and
forming a storage capacitor by overlapping an extended drain electrode with the storage line and with the gate insulating film in between.

24. The method according to claim 20, wherein the reflection electrode overlaps both sides of the gate line and extends along a side surface of the transmission hole that is adjacent to the gate line and connected to the pixel electrode.

25. The method according to claim 24, wherein the reflection electrode is connected to a side surface of the drain electrode exposed through the transmission hole and is connected to the second conductive layer of the pixel electrode exposed through the transmission hole.

26. The method according to claim 24, wherein both sides of the reflection electrode project to overlap the data line.

27. The method according to claim 26, wherein the floating electrode is formed to overlap the data line between projected area of the reflection electrode.

28. The method according to claim 20, wherein the floating electrode is formed long along the data line and is separated from a floating electrode of an adjacent pixel area.

29. The method according to claim 20, wherein the floating electrode extends along a side surface of the transmission hole that is adjacent to the data line and the floating electrode is opened with the pixel electrode.

30. The method according to claim 20, wherein the floating electrode is formed to overlap the gate line and the data line.

31. The method according to claim 20, wherein the pixel electrode is formed to overlap both sides of the data line.

32. The method according to claim 20, wherein the pixel electrode is separated from the data line without overlapping the data line.

33. A method of fabricating a liquid crystal display device, comprising:
forming a first mask pattern group including a gate line, a gate electrode, and a pixel electrode having a double layer structure of a transparent first conductive layer and an opaque second conductive layer;
forming a gate insulating film on the first mask pattern group, a semiconductor pattern on the gate insulating film, and a source/drain metal pattern having a data line, a source electrode, and a drain electrode on the semiconductor pattern;

forming an organic insulating film on the source/drain metal pattern;

forming a transmission hole penetrating from the organic insulating film to the gate insulating film to expose the pixel electrode;

forming a reflection electrode on the organic insulating film that does not overlap the data line that extends along a side surface of the transmission hole to connect the pixel electrode and the drain electrode; and removing the second conductive layer of the pixel electrode exposed through the reflection electrode.

34. The method according to claim 33, wherein forming the organic insulating film further includes:

forming a passivation film on the source/drain metal pattern.

35. The method according to claim 33, wherein the organic insulating film has an embossed surface.

36. The method according to claim 33, further including:

forming a storage line substantially parallel to the gate line; and forming a storage capacitor by overlapping an extended drain electrode with the storage line and with the gate insulating film in between.

* * * * *